US006301430B1

(12) United States Patent
Oguro et al.

(10) Patent No.: US 6,301,430 B1
(45) Date of Patent: *Oct. 9, 2001

(54) APPARATUS AND METHOD FOR TV BROADCAST COPY PROTECTION

(75) Inventors: Masaki Oguro, Tokyo; Keiji Kanota; Yukio Kubota, both of Kanagawa, all of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/721,340

(22) Filed: Sep. 26, 1996

(30) Foreign Application Priority Data

Sep. 29, 1995  (JP) .................................................... 7-276931

(51) Int. Cl.⁷ ................................................ H04N 5/91
(52) U.S. Cl. .............................. 386/94; 360/60; 380/203
(58) Field of Search .............................. 386/124, 94, 96; 360/60; 348/498; 380/5, 7, 10, 22, 201, 203

(56) References Cited

U.S. PATENT DOCUMENTS

| | | | |
|---|---|---|---|
| 4,109,276 | * 8/1978 | Hopkins, Jr. et al. | 358/4 |
| 5,315,448 | * 5/1994 | Ryan | 360/60 |
| 5,583,654 | * 12/1996 | Oguro | 386/96 |
| 5,778,064 | * 7/1998 | Kori et al. | 360/60 |
| 5,907,656 | * 5/1999 | Oguro | 386/94 |
| 5,960,151 | * 9/1999 | Takahashi | 386/94 |
| 6,047,103 | * 4/2000 | Yamauchi et al. | 386/94 |

FOREIGN PATENT DOCUMENTS

| | | |
|---|---|---|
| 0 574 892 A | 6/1993 | (EP) . |
| 0 580 367 A | 7/1993 | (EP) . |
| 0 581 227 A | 7/1993 | (EP) . |

* cited by examiner

Primary Examiner—Wendy R. Garber
Assistant Examiner—Christopher Onuaku
(74) Attorney, Agent, or Firm—Frommer Lawrence & Haug LLP; William S. Frommer; Dexter T. Chang

(57) ABSTRACT

Copy protecting television broadcast program signals which are received and recorded in a format that reserves recording areas for accessory information relating to the format and reserves other recording areas for digital image signals. When the input signals received for recording are determined to be television broadcast program signals, a generation limiting signal inserted therein is set to a copy protect state and is recorded to inhibit copying.

4 Claims, 29 Drawing Sheets

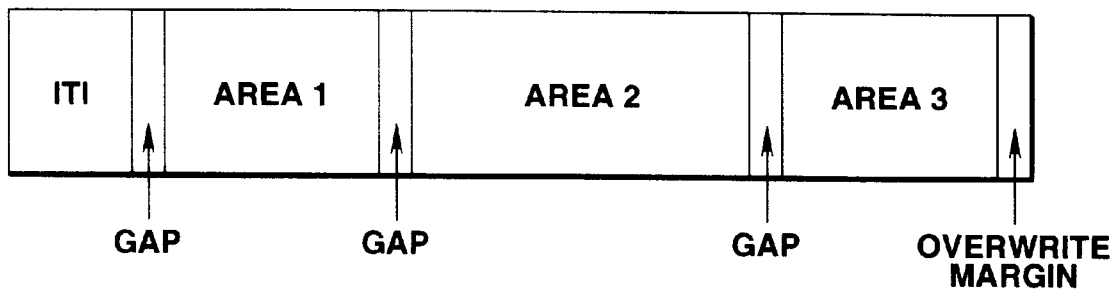
APT = 000
FIG.5A
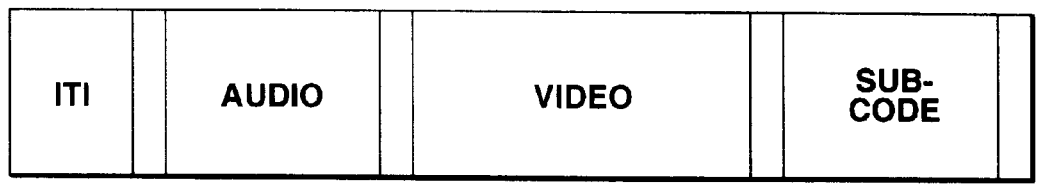
AP1 = AP2 = AP3 = 0
FIG.5B
| WORD NAME | MSB            LSB |
|---|---|
| PC0 | HEADER |
| PC1 | DATA |
| PC2 | |
| PC3 | |
| PC4 | |
FIG.6

| MSB | LSB | |
|---|---|---|
| UPPER | LOWER | |
| 0 0 0 0 | × × × × | CONTROL |
| 0 0 0 1 | × × × × | TITLE |
| 0 0 1 0 | × × × × | CHAPTER |
| 0 0 1 1 | × × × × | PART |
| 0 1 0 0 | × × × × | PROGRAM |
| 0 1 0 1 | × × × × | AAUX |
| 0 1 1 0 | × × × × | VAUX |
| 0 1 1 1 | × × × × | CAMERA |
| 1 0 0 0 | × × × × | LINE |
| 1 0 0 1<br>⋮<br>1 1 1 0 | × × × ×<br>⋮<br>× × × × | RESERVED |
| 1 1 1 1 | a a a a | SOFT MODE |
| 1 1 1 1 | 1 1 1 1 | NO INFORMATION |

| TRACK NUMBER → | 1 | 2 | 3 | 4 | 5 | 6 | 7 | 8 | 9 | 10 |
|---|---|---|---|---|---|---|---|---|---|---|
| 8 | 55 | f | 55 | | 55 | | 55 | | 55 | |
| 7 | 54 | e | 54 | | 54 | | 54 | | 54 | |
| 6 | 53 | d | 53 | | 53 | | 53 | | 53 | |
| 5 | 52 | 55 | 52 | 55 | 52 | 55 | 52 | 55 | 52 | 55 |
| 4 | 51 | 54 | 51 | 54 | 51 | 54 | 51 | 54 | 51 | 54 |
| 3 | 50 | 53 | 50 | 53 | 50 | 53 | 50 | 53 | 50 | 53 |
| 2 | c | 52 | i | 52 | | 52 | | 52 | | 52 |
| 1 | b | 51 | h | 51 | | 51 | | 51 | | 51 |
| 0 | a | 50 | g | 50 | | 50 | | 50 | | 50 |

↑ PACK NUMBER

FIG.13

AAUX SOURCE CONT PACK

| | | | | | | | | |
|---|---|---|---|---|---|---|---|---|
| PC0 | 0 | 1 | 0 | 1 | 0 | 0 | 0 | 1 |

| | | | | |
|---|---|---|---|---|
| PC1 | SCMS/CGMS | COPY SOURCE | COPY GEN | SS |
| PC2 | REC ST | REC END | REC MODE | 1 1 1 1 |
| PC3 | DRF | SPEED | | |
| PC4 | RI | GENRE CATEGORY | | |

CGMS :
    UPPER BITS : 0 = NO COPY RIGHT
                          1 = COPY RIGHT
    LOWER BITS : 0 = ORIGINAL
                          1 = NOT ORIGINAL

RI (REC INHIBIT) :
    0 = DUBBING INHIBITED
    1 = DUBBING POSSIBLE

FIG.14

VAUX SOURCE CONT PACK

| | | | | | | | | |
|---|---|---|---|---|---|---|---|---|
| PC0 | 0 | 1 | 1 | 0 | 0 | 0 | 0 | 1 |
| PC1 | SCMS/CGMS | | COPY SOURCE | | COPY GEN | | SS | |
| PC2 | REC ST | 1 | REC MODE | | 1 | | DISP | |
| PC3 | FF | FS | FC | IL | ST | SC | BCSYS | |
| PC4 | RI | GENRE CATEGORY | | | | | | |

COPY SOURCE :
    00 = ANALOG INPUT
    01 = DIGITAL INPUT
    10 = RESERVED
    11 = NO INFORMATION

COPY GENERATION :
    00 = 1st GENERATION
    01 = 2nd GENERATION
    10 = 3rd GENERATION
    11 = NO INFORMATION

FIG.15

GENERATION DATA FOR MAIN AREA

TV CHANNEL
BW, EN, CLF
SOURCE CODE, 50/60, STYPE
TUNER CATEGORY

COPY SOURCE, COPY GEN, CI
REC ST, REC MODE, FF, FS, FC, IL, ST, SC
GENRE CATEGORY
REC DATE

REC TIME
BINARY GROUP

FIG.24

GENERATION DATA FOR MAIN AREA

LF, CH, PA
EF, TC, 50/60, STYPE
TUNER CATEGORY

COPY SOURCE, COPY GEN, CI
REC ST, REC END, REC MODE
INSERT CH, DRF, SPEED
GENRE CATEGORY

REC DATE
REC TIME
BINARY GROUP

FIG.26

APPARATUS AND METHOD FOR TV BROADCAST COPY PROTECTION

BACKGROUND OF THE INVENTION

The present invention relates to recording and reproducing a digital picture signal and, more particularly, to copy protecting television broadcast programs recorded and reproduced as a digital picture signal.

Television broadcast programs are recorded and played back by a viewer using a video tape recorder (VTR). The VTR may be an analog VTR, but analog technology cannot record a TV program with high image quality and, as a result, the reproduced analog TV broadcast program has a lower image quality than the originally broadcast TV program.

A commercially available digital VTR, on the other hand, offers high image recording quality. With the digital VTR, therefore, the reproduced TV program has virtually the same image quality as the originally broadcast TV program.

Copyright protection of video programs on video tape is available in both analog and digital VTRs. In the analog VTR, a copyright protection signal is inserted into the blanking interval of the pre-recorded analog video signal. The copyright protection signal prevents the analog VTR from copying a copyright protected analog video program from a commercially available analog video tape. The digital VTR provides a Serial Copy Management System (SCMS) to copyright protect a digital video program on a digital video tape. A form of the SCMS copyright protection system has been used to prevent copying of audio data recorded on a Digital Audio Tapes (DAT). The SCMS technique restricts copying, but is limited to copy protecting output digital signals and is ineffective if those digital signals are converted to analog form.

Problematically, the above-described copy protection techniques can be circumvented. If a digital VTR inserts a copyright protection code into the digital video data to prevent another digital VTR from copying the digital video program, the conversion of the digital video program to analog form could defeat such protection. An analog VTR does not recognize the digitally recorded copyright protection signal. By obtaining the analog video program from analog output terminals of the digital VTR, therefore, the above copyright protection schemes are circumvented. Worse, since the unauthorized copy is made from the high image quality reproduction of the digital VTR, an unauthorized high image quality copy is produced.

A technique for protecting a copyrighted program for use in a digital VTR has been described in Japanese Patent Applications Nos. 5-277633 and 6-82576. According to the proposed technique, a video signal is recorded with a copyright protection signal inserted into a line of the video signal together with data that specifies which line contains the protection signal. A parameter for coding the copyright protection signal is recorded in a data pack. However, the proposed technique does not copyright protect TV broadcast signals.

OBJECTS AND SUMMARY OF THE INVENTION

It is, therefore, an object of the invention to provide copyright protection of a TV broadcast program.

It is a further object of the invention to provide copyright protection of a TV broadcast program recorded by a digital VTR which is effective even if the digitally recorded program is reproduced by another digital VTR or by an analog VTR coupled thereto through a digital interface or by a digital VTR having an analog video output.

In accordance with the above objectives, a copy protection method and apparatus are provided for copy protecting a television broadcast program that is to be recorded in a digital format that reserves recording areas for accessory information concerning the structure of the tape format and for the input image signal. When the input signal is determined to be a television broadcast program, a generation limiting signal is set to a copy protect state and inserted into the received signal for recording therewith. Preferably, this generation limiting signal is recorded in a pack with the accessory information. If the digitally recorded television signal is reproduced and supplied as an output analog signal, the generation limiting signal is used to insert a copy protect signal into the analog output.

BRIEF DESCRIPTION OF THE DRAWINGS

The above objects, features and advantages of the present invention will become apparent from the following detailed description of illustrative embodiments which is to be considered in connection with the accompanying drawings, in which:

FIGS. 5A and 5B are diagrams showing data structures on a track when APT=000;

FIG. 6 is a diagram showing the structure of pack data;

FIG. 8 is a table showing the summary of a pack header;

FIG. 13 is a table for describing 9 packs of the audio data along a track;

FIG. 14 is a diagram showing the content of an AAUX SOURCE CONTROL pack;

FIG. 15 is a diagram showing the definition of a VAUX SOURCE CONTROL pack;

FIG. 24 is a diagram showing the data content for the main area of the VAUX pack data;

FIG. 26 is a diagram showing the data content for the main area of the AAUX pack data;

DETAILED DESCRIPTION OF THE PREFERRED EMBODIMENTS

Figure 1:
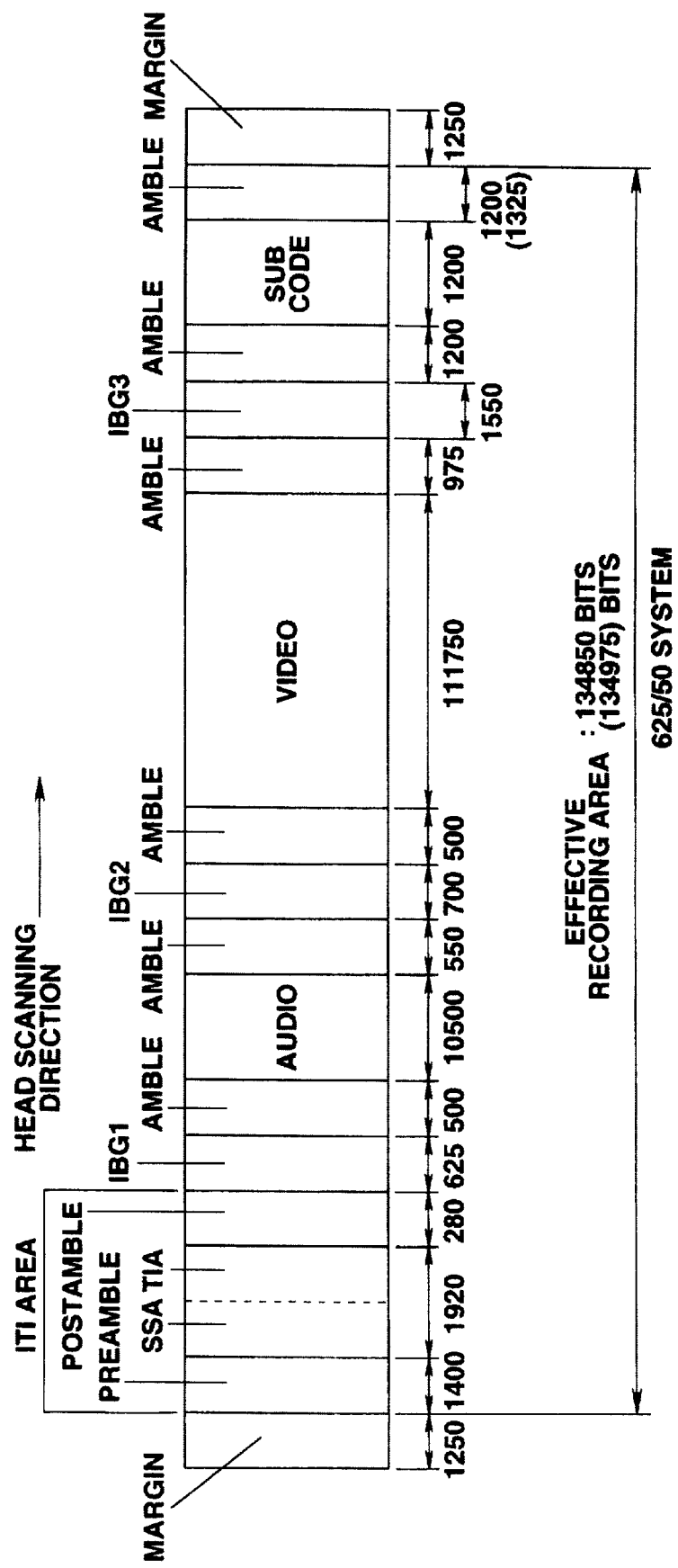
FIG. 1 is a diagram of the tape format of one track in a digital VTR to which the present invention applies.

Referring now to the drawings, wherein like reference numerals designate identical or corresponding parts throughout the several views, the present invention will now be described.

Tape Format

Before describing the present invention, reference is made to the format in which digital video signals are recorded on tape. The digital VTR records tracks using a helical recording technique, wherein a rotary magnetic head spins at an angle to the video tape which travels along a head scan direction. The resulting track pattern has tracks arranged at a slant along the tape medium (not shown). An example of the format for a track is shown in FIG. 1, wherein the track begins and ends with margins (1250 bits) that define the data area. Insert and Track Information (ITI) is provided at the beginning of each track and includes timing information representing the position of the audio, video and subcode areas within the track. Inter-Block Gaps (IBG1, IBG2, IBG3) segregate the audio, video and subcode areas of the track. An audio area of 10500 bits provides for audio data storage followed by a video area of 111,750 bits for video data storage, and, then, by a subcode area of 1200 bits for the subcode area. Pre-ambles and post-ambles bound the audio, video and subcode areas. For a 525 line/50 Hz VTR system, 10 such tracks are used to record a single video frame (including audio data) of an audio/video program, which 12 tracks accommodate a 625 line/60 Hz system.

Figure 2:
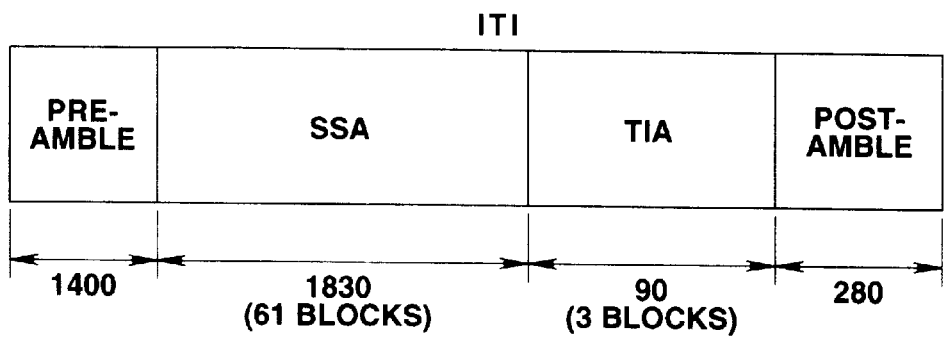
FIG. 2 is a diagram showing a structure of the ITI area shown in FIG. 1.

The ITI is a header of the track and includes information for aligning the audio, video and subcode data within that track for after recording operations. As shown in FIG. 2, the ITI area begins with a preamble which is comprised of 1400 bits used as a run-in for the magnetic head of the VTR. The preamble is followed by a Start Sync Block Area (SSA) comprised of 1830 bits with 61 sync blocks (30 bits apiece) therein. These sync blocks contain synchronizing information which is useful for timing the audio, video and subcode areas of each track. When audio copying or re-recording is performed, for example, the sync block containing the timing information for the audio area is detected from the SSA and the position of the desired audio area can be determined therefrom.

It will be appreciated that it is; difficult to keep the magnetic head of the VTR in contact with the inlet side of each track because of mechanical limitations, making scanning of the inlet side of each track unstable. This is true for the ITI area which is placed near the inlet of each track. To enhance the sensing probability of the sync blocks, the length of the sync blocks is shortened and the number of sync blocks is increased.

Following the SSA are 90 bits of a Track Information Area (TIA) formed of three blocks which, as will be explained in more detail, store information about the track. Each block includes an Application ID of a Track (APT) (three bits) including an SP/LP bit which indicates track pitch; a reserve bit; and a Pilot Frame (PF) bit which represents a reference for the servo system. The TIA is followed by the postamble composed of 280 bits which is used to provide a margin for the ITI area.

Figure 3:
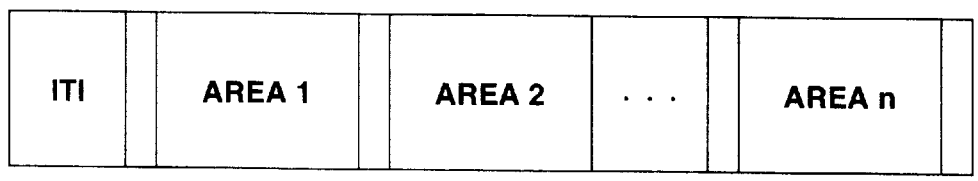
FIG. 3 is a diagram showing the data structure of a track defined by an application ID (APT)

The track in FIG. 1 includes audio, video and subcode areas; but each track may contain n data areas such as shown in FIG. 3. The ITI indicates where these areas begin/end and the digital VTR employs the ITI to quickly find and retrieve the desired area (AREA1, AREA2, AREA3). An application ID may be provided for each area.

Figure 4:
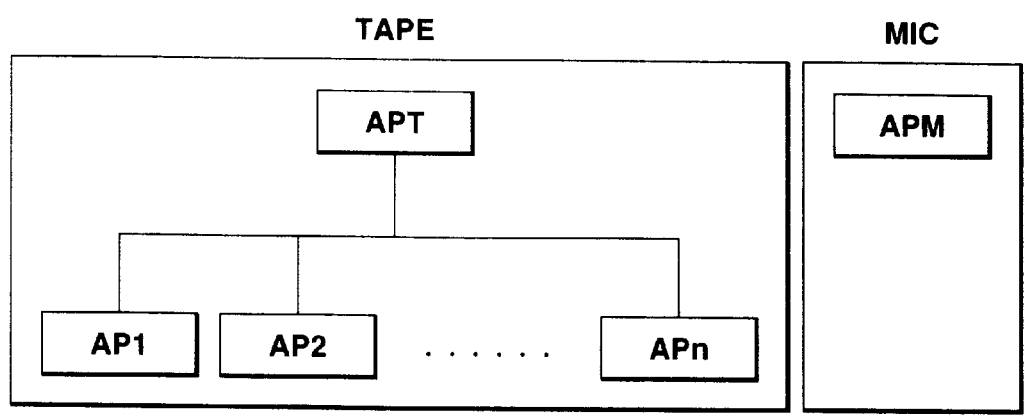
FIG. 4 is a diagram showing the application ID (APT) structure.

The application ID (APT) stored in the TIA designates the different areas as being video, audio or sub-code areas. The application ID (APT) preferably is arranged as an hierarchy of application IDs as shown in FIG. 4. With such an hierarchical structure, whole branches of data including several areas of the hierarchical "tree" can be extracted by the digital VTR. Thus, newly defined data areas may be accommodated by this hierarchical structure.

In addition to storing this hierarchical structure in the TIA of the tape, an hierarchy may be stored in a memory IC (MIC) of the tape cassette that is used with the digital VTR. The MIC can be employed to store information relating to all of the recorded programs on the video tape to assist the VTR in recording and reproducing the data from a newly loaded record medium. For example, the MIC can be used to mark a predetermined program, designate the reproduction order of programs, designate a predetermined scene for reproducing a still image (i.e., a photo), reserve a timer record operation, etc.

The application ID of the MIC (APM) is shown in FIG. 4 and may occupy the high order 3 bits of adrress 0. In a similar manner to the hierarchical structure of Application ID of the tracks (APT), the APM determines the data structure of the MIC. Japanese Patent Applications 5-277633 and 6-82576 describe an MIC which may be used for this purpose.

It will be appreciated that the application ID is not an ID for defining an application of the digital VTR, but is an ID for defining the data structure of an area of the record medium. That is, the application ID (APT) stored in the TIA defines the data structure on the track, and the application ID (APM) of the MIC defines the data structure of the MIC.

As an example of the application ID (APT) defining the data structure of different areas of the track, reference will be made to FIGS. 5A and 5B. When the application ID (APT) is set=000, the track is arranged as shown in FIG. 5A with three areas (AREA1, AREA2 and AREA3). The application IDs (AP1, AP2, AP3) are stored in each respective area and contain information on the arrangement of the data within the respective area. For example, when the information in the AP1 is set=000, the data structure of AREA1 is an audio data structure which includes Audio Accessory Data (AAUX); when the information in AP2 is set=000, the data of AREA2 is video data which includes Video Accessory Data (VAUX); and, when AP3 is set=000, the data of AREA3 is subcode data. It will be appreciated that configuring the application ID for the three areas AP1, AP2 and AP3=000 corresponds to a configuration for commercial use. Thus, the three areas (AREA1, AREA2, AREA3) shown in FIG. 5A are designated as audio, video and subcode areas, respectively, as shown in FIG. 5B. Of course, any digital representation for an application ID can be used to indicate the data structure. Also, the application ID (APM) may be of a similar structure.

With the specific format set by the application ID (APT), the digital VTR records the different data (audio, video, subcode) onto the record medium. The actual AAUX, VAUX and subcode data are recorded in the areas (AREA1, AREA2, AREA3) as a plurality of structures called packs having the common pack structure shown in FIG. 6. As shown, a pack is composed of 5 bytes (PC0 ... PC4) with the high order byte reserved as a header (PCO) and the 4 lower bytes reserved for data.

Figure 7:
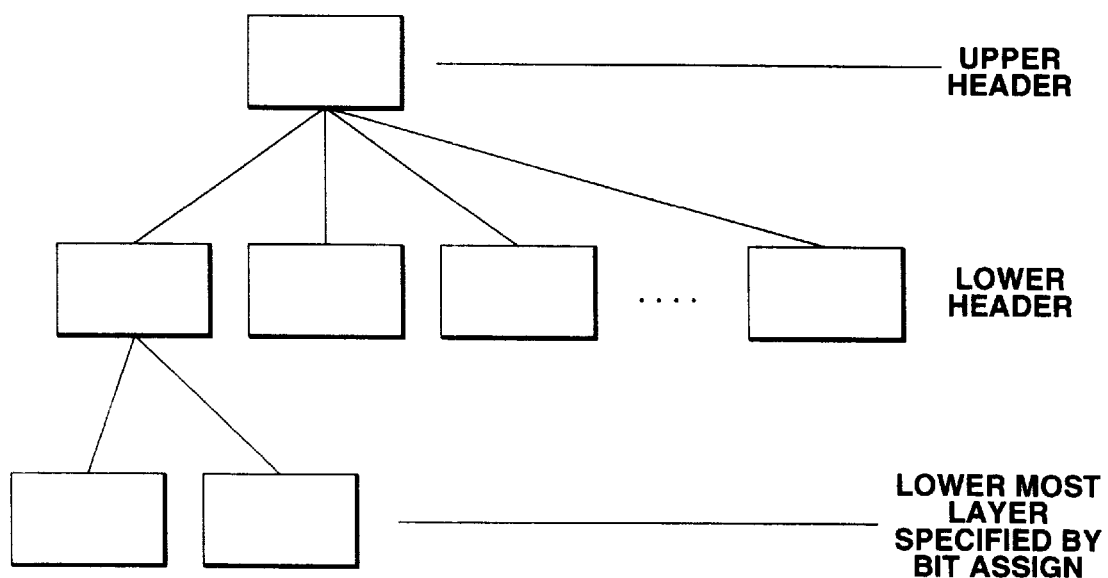
FIG. 7 is a diagram showing an hierarchical structure of a header.

The header is divided into the hierarchical structure shown in FIG. 7. The high order or upper 4 bits of the header (PCO), for example, serve as an upper header and the lower order 4 bits of the header serves as a lower header in the hierarchical structure shown in FIG. 7. The hierarchy can be expanded to further lower levels by using the bits in the lower header. With this arrangement, it is possible to clearly systemize the content of each pack and easily expand the packs. When the pack header is represented by a table, for example, the 8 bits of the pack header can represent 256 different pack structures.

FIG. 8 shows such a pack header table for tabulating pack header codes that define the structure of the corresponding pack. The upper four bits of the pack header table constitute what is called a large item and the lower four bits constitute what is called a small item. The large item indicates the manner in which the small item, containing the information about the pack structure, is to be applied. FIG. 8 shows the large item set to "0000" for providing control; a large item of "0001" indicates the title; a large item of "0010" indicates a chapter; a large item of "0011" indicates a part; a large item of "0100" indicates a program; a large item of "0101" indicates AAUX data; a large item of "0110" indicates VAUX; a large item of "0111" indicates a camera; a large item of "1000" indicates a line; and a large item of "1111" indicates a soft mode. Large items "0101" indicating AAUX data and "0110" indicating VAUX data provide small items such as a source control "0001", a recording signal source "0000", a recording date "0010" and a recording time "0011".

The large item "1000" provides small items for providing information for a recording operation of a line of the vertical blanking period or the effective scan period of a TV signal, such as data sampled from a video signal. The small item information for the line "1000" provides information for recording the video line such as, for example, a line header "0000", a luminance (Y) "0001", color difference "0010" (R-Y), "0011" (B-Y), red (R) "0101", green (G) "0110", and blue (B) "0111".

It will be noted that large items "1001" to "1110" in FIG. 8 are reserved for additional data. Items which are undefined, for example, may be coded as the reserved large items, thus defining new definitions for optionally recording new data in the future.

Figure 9:
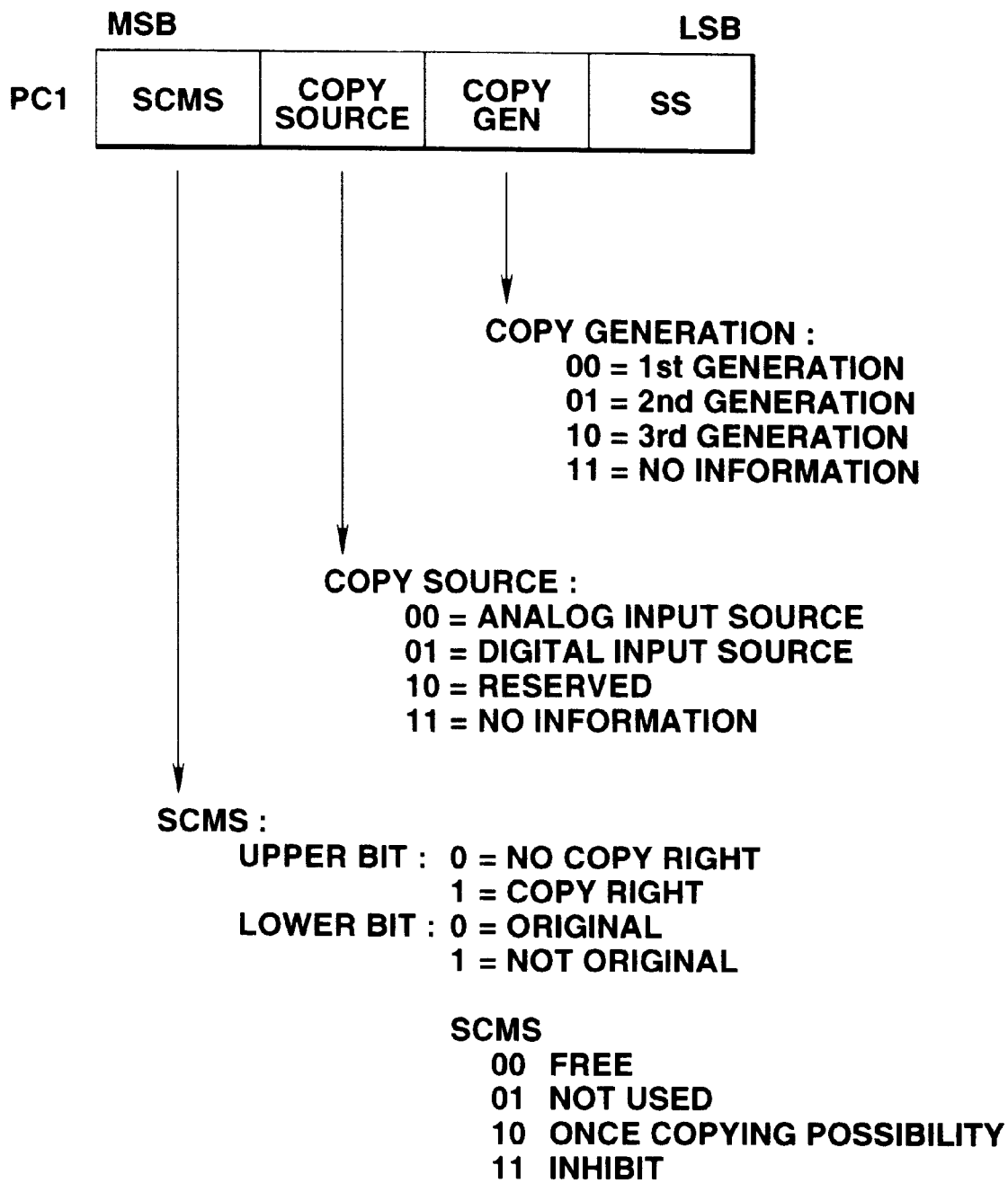
FIG. 9 is a diagram showing the PC1 data structure of a source control pack.

An example of the source control pack for either the AUUX or VAUX indicated by the source control large item "0000" is shown in FIG. 9 as data area PC1 of the pack of FIG. 6. Serial Copy Management System (SCMS) data is stored in the first two bits of PC1 which determine the copy protection of the recorded video program; copy source data is stored in the next two bits which determine the source of the data to be copied; copy generation data is stored in the following two bits; cipher type is stored in the next bit; and cipher data is stored in the least: significant bit (LSB).

As shown in FIG. 13, packs are arranged within a track in a grid with, for example, each of the packs (0 ... 8) corresponding to an AAUX pack. Each data pack is fixed in length to 5 bytes. However, when data is written to the MIC, the pack structure has a variable length such that the MIC can be filled to capacity to obtain the most efficient use of the MIC.

Figure 10:
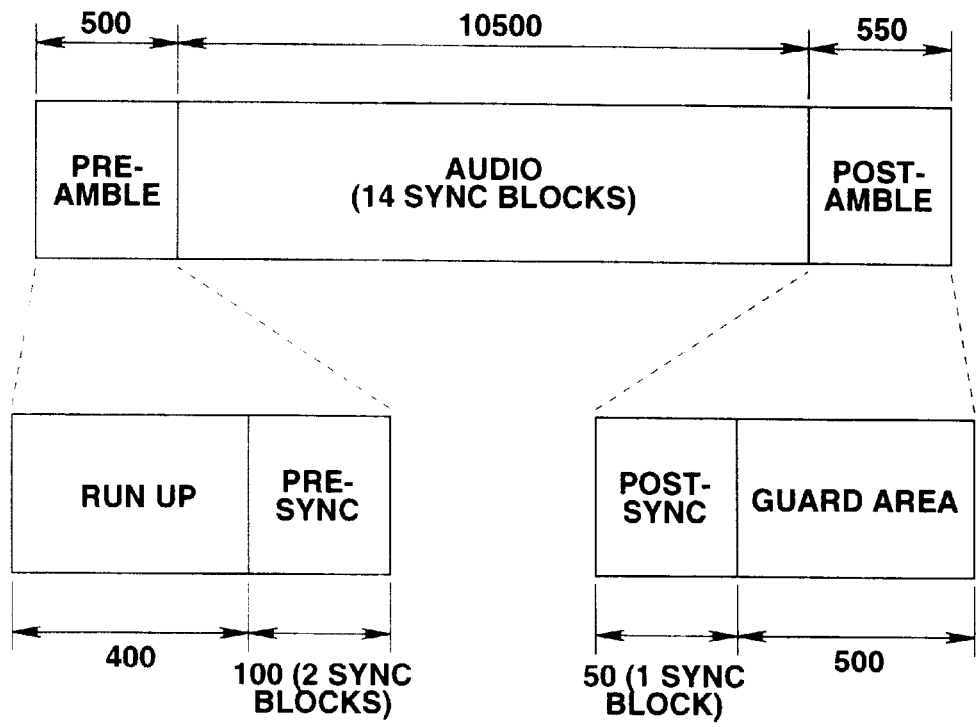
FIG. 10 is a diagram showing the structure of an audio sector.

The audio data is stored in an audio sector on the record medium in the arrangement shown in FIG. 10 including a preamble, an audio area and a postamble. The video data is stored in an analogous video sector. The preamble includes a run-up of 400 bits for synchronizing a PLL followed by 100 bits of pre-sync information used for pre-detection of the audio sync blocks in the audio area. The audio area stores the audio data and is composed of 14 audio sync blocks (10,500 bits). The postamble includes 50 bits of a post-sync block used to definitively mark the end of the audio sector followed by 500 bits of a guard area to prevent after-recorded audio data from overlapping into the next video sector.

Figure 11A:
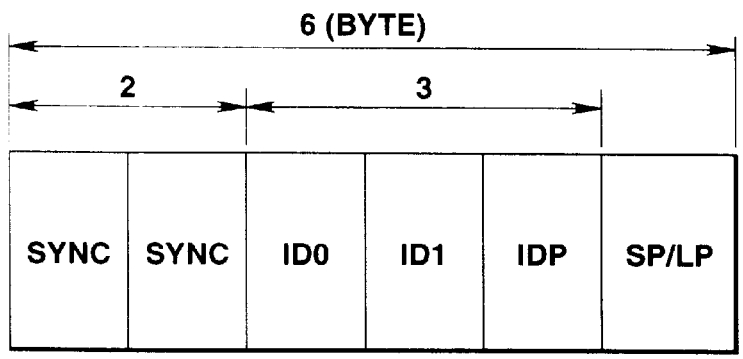
FIGS. 11A and 11B are diagrams showing the pre-SYNC and post-SYNC bytes of an audio sector.
Figure 11B:
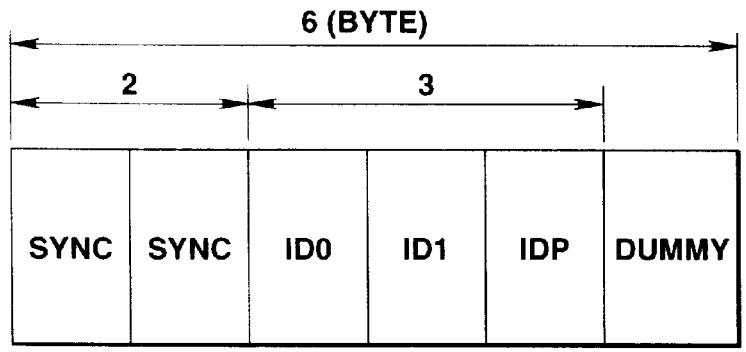

The pre-sync and the post-sync blocks are shown in more detail in FIGS. 11A and 11B, respectively. The pre-sync block is shown as having 6 bytes, including an SP/LP byte, which indicates a standard-play (SP) or a long-play (LP) mode. Notably, the SP/LP byte is omitted from the post-sync block of FIG. 1B. When the SP/LP block is set=FFh, for example, the SP mode is indicated; and, when the SP/LP is set=00h, the LP mode is indicated. It will be appreciated that the SP/LP byte is stored as an SP/LP flag in the TIA area of the ITI and is stored in the pre-sync block as a back-up in case the TIA area cannot be read. The remainder of the pre-sync and post-sync blocks contain two sync bytes, followed by three identification bytes (ID0, ID1 and IDP).

The bit lengths for the pre-sync and post-sync blocks are calculated as follows. The pre-sync block has 6 bytes (FIG. 11A) with 8 bits in each byte making a total of 48 bits. The pre-sync block is converted from 24-bit data into 25-bit data by a 24 to 25 conversion, thus a 25/24 conversion factor factoring 48 bits=50 pre-sync bits. There are two pre-sync blocks, resulting in 6×2×8×25÷28=100 bits. There is only one post-sync block having the same overall structure resulting in 6×1×8×25÷24=50 bits.

Figure 12A:
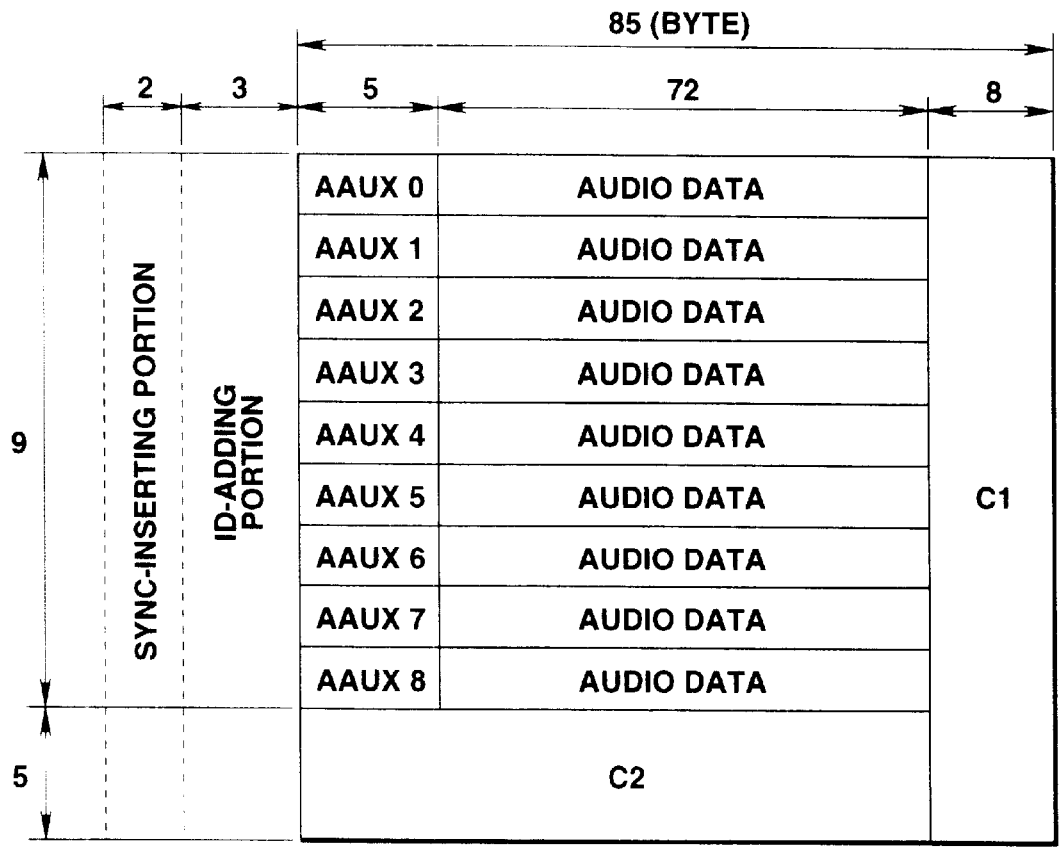
FIGS. 12A and 12B are diagrams showing a SYNC block and a framing format of the audio sector.
Figure 12B:
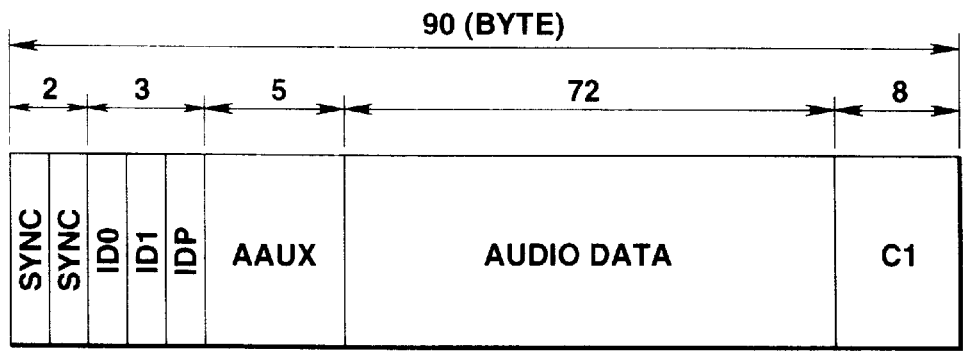

The audio sync blocks are collected and recorded on the record medium in the audio area (FIG. 5B) in groups of 14 sync blocks per track as shown in FIG. 12A. The first nine audio sync blocks (0 ... 8) contain the audio data, whereas the last five sync blocks are reserved for parity information. Five bytes of each audio sync block are reserved for the AAUX pack, two bytes of the sync block are reserved for sync bytes, and three bytes of the sync block are reserved for ID bytes, all as shown in FIGS. 12A and 12B. Recalling that the digital VTR performs a "24 to 25" conversion prior to the recording of the digital signal, the total bit length of the group of 14 sync blocks per track is 90 bytes per audio sync block (FIG. 12B)×14 audio sync blocks×8 bits per byte×25/24 conversion factor=10,500 bits.

The audio area of FIG. 12A preferably includes the parity sectors C1 and C2. The parity sector C1 occupying the last 8 bytes of each audio sync block is known as horizontal parity because C1 assists the digital VTR in detecting areas in the data of the respective audio sync blocks. The parity sector C2 occupying the last 5 audio sync block positions of FIG. 12A, on the other hand, is known as a vertical parity because C2 assists the digital VTR to determine what will be seen as vertical errors in all the sync blocks.

The digital VTR records the AAUX data as data packs onto the record medium in the manner shown in FIG. 13. Each of the pack numbers (0 . . . 8) in FIG. 13 represents the AAUX packs (0 . . . 8) in FIG. 12A, and packs (0 . . . 8) are comprised of pack headers 50 to 55 (hexadecimal) and optional packs (a . . . g). It will be appreciated that AAUX packs, such as shown in FIG. 12A, are written ten times over ten tracks to ensure that the information in each data pack is recovered during a reproducing operation even if a portion of the data is lost due to a mechanical failure. By writing the pack data repeatedly over ten tracks, recovery of the AAUX data is ensured even if a portion of the record medium is corrupted.

The optional packs are also written ten times. However, the number of total optional packs changes with the video system. In the 525/60 VTR system of FIG. 13, for example, 30 optional packs are recorded in a video frame and, therefore, three optional packs are recorded in each track over ten tracks. On the other hand, in a 625/60 VTR system, 36 optional packs are recorded. It will be appreciated that the optional packs are truly optional and may, or may not, be selected among the types of data shown by the pack header table in FIG. 8.

In Japanese Patent Application 6-19991, a method for packing data retrieved from the vertical blanking interval (VBID) is described. There, the packed data is restored in the vertical blanking interval during playback; and during recording the picture data is recorded but the vertical blanking interval is discarded.

The main area data blocks (50 . . . 55) store essential information about the audio data, such as a sampling frequency for reconstructing the audio signal and the number of quantizing bits in each sample, for example. Normally, these packs are linked in sequence, but may also be linked in another order. In FIG. 13, for example, the audio packs are linked in the direction of the arrows forming the sequence (a, b, c, 50, 51, 52, 53, 54, 55). Japanese Patent Application 6-19991 describes restoring the VBID data from the packs indicated by pack headers 61h and 51h of the main area data packs.

An example of a data pack configured as an AUUX pack is shown in FIG. 14. The pack header (PC0) includes a large item "0101" indicating an AAUX pack according to the pack header table (FIG. 8). Byte PC1 includes copy generation information including two bits of SCMS code (FIG. 9) incorporating copy generation limiting signals (CGMS). The individual bits of the SCMS code represent the CGMS information shown in FIG. 9 and indicate whether the corresponding audio data is copyrighted. The two-bit combination of the SCMS bits represents SCMS information for managing the CGMS information. The specific designations shown in FIG. 9 are reproduced here for convenience.

| | |
|---|---|
| Upper CGMS bit; | 0 = not copyrighted |
| | 1 = copyrighted |
| Lower CGMS bit; | 0 = original |
| | 1 = not original |
| SCMS Combination; | 00 = freely copied |
| | 01 = not used |
| | 10 = one copy allowed |
| | 11 = copying prohibited |

For example, the CGMS bits "10" read from an AAUX pack indicate that one copy of the copyrighted, original audio track is allowed. Then, the CGMS data is rewritten in the pack PC1 to "11" to prohibit further copying. The AAUX pack of FIG. 14 includes in byte PC4 a record inhibit (RI) bit to inhibit or allow copying of the corresponding audio data.

The video data is stored in sync blocks of a video region in a similar fashion to the audio region shown in FIG. 10. Similar to the audio region, the video region includes a preamble, a video area and a postamble. Since video data is more comprehensive than audio data, however, more video sync blocks (i.e., bytes per video sync block) are used by the video region than by the audio region. Specifically, the video area is formed of 111,750 bits (versus 10,500 bits of the audio area) and the video guard area is formed of 925 bits (versus 500 bits of the audio guard area). The guard area of the video data is larger than in the audio data because video data tends to be larger than audio data and more guard bits are preferred to ensure that the video data does not overlap into adjoining areas of the record medium. The video sync blocks of the video sector may also include the parity portions C1 and C2, similar to that shown in FIG. 12A.

A data pack configured as a VAUX source control pack, for example, is shown in FIG. 15. Similar to the AAUX source control pack of FIG. 14, the VAUX source control pack includes a pack header with a large item "0110" indicating VAUX data; copy generation limiting signals in byte PC1; and a recording inhibit bit (RI) in byte PC4.

Subcode data is also recorded on the record medium in GL data pack arrangement. The subcode region includes 1200 bits of a preamble, 1200 bits of a subcode area and 1325 (or 1200) bits of a postamble. Unlike the audio and video regions, the preamble of the subcode region does not have a pre-sync block and the postamble of the subcode region does not have a post-sync block. This is because the subcode region is frequently rewritten for indexing during a search, and updating the pre-sync and post-sync blocks each time during the search is time consuming. The subcode area preferably contains 12 subcode sync blocks with each subcode sync block including 5 pre-sync bytes; 5 data bytes of auxiliary data; and 2 parity bytes C1 as shown in FIG. 12A, thus forming a 12-byte sync block.

Figure 16:
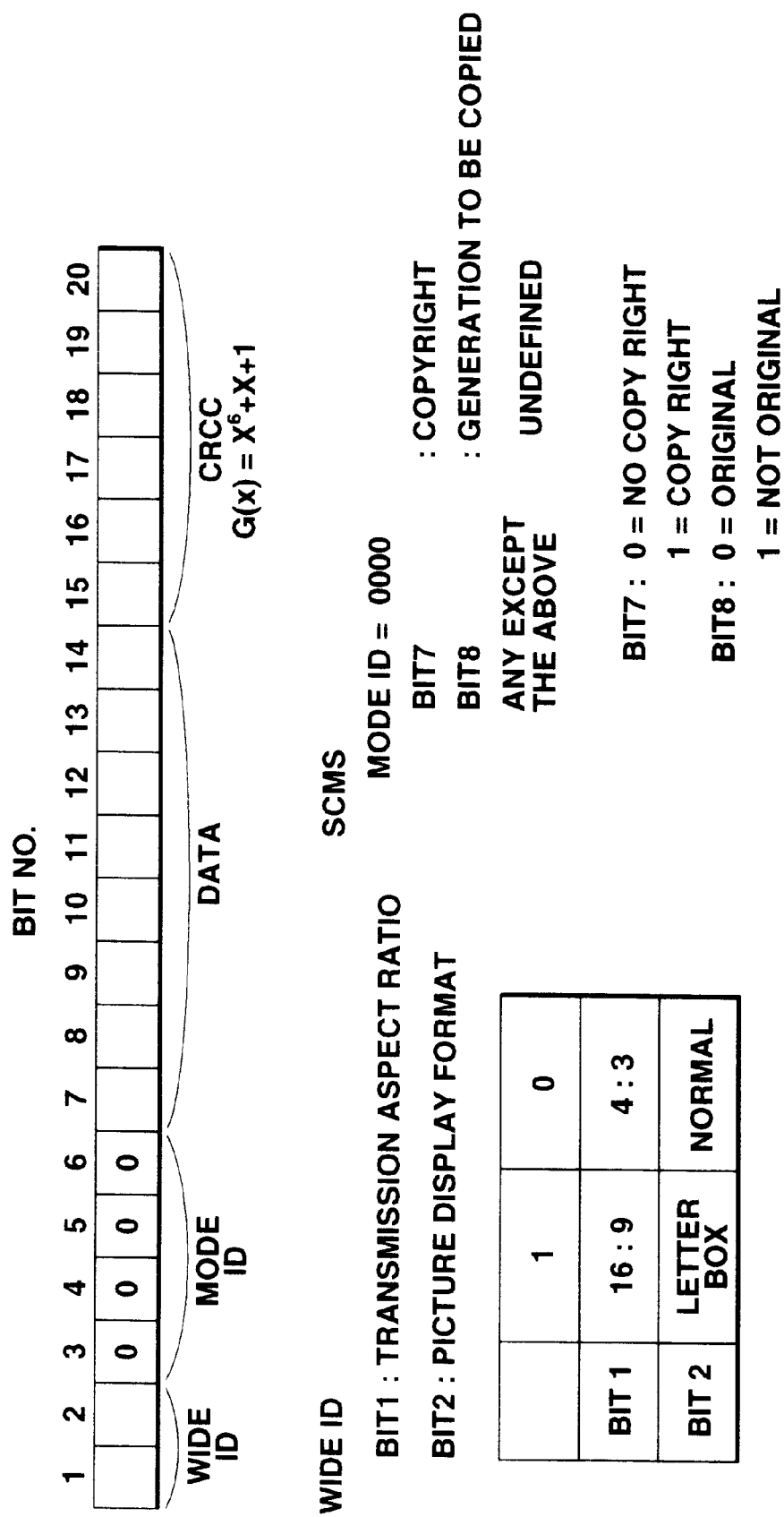
FIG. 16 is a diagram showing the structure of VBID with a 2-bit CGMS.

The CGMS data of the AAUX and VAUX source control packs (FIGS. 14, 15) is extracted therefrom and directly copied into the vertical blanking interval data (VBID) of the digital video signal shown in FIG. 16. As shown, the CGMS bits are inserted into BIT 7 and BIT 8 of the data section of the VBID. It will be noted that the VBID also includes WIDE ID data (bits 1 and 2) including a transmission aspect ratio (BIT 1) and a picture display format (BIT 2); a MODE ID (bits 3–6) for indicating the mode of the video signal; data bits 7–14; and CRCC information in bits 15–20.

CGMS Retrieval/TV Broadcast Detection

Figure 17A:
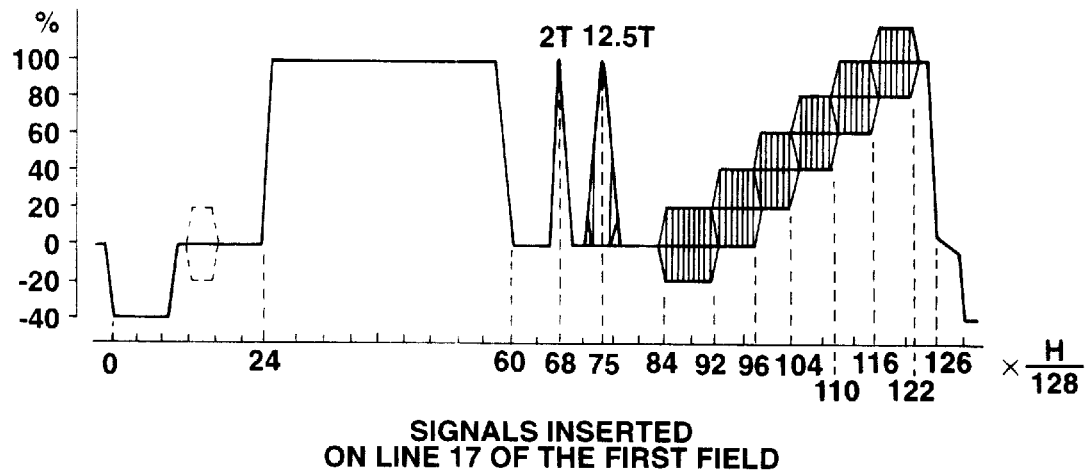
FIGS. 17A and 17B are graphs showing a VITS signal.
Figure 17B:
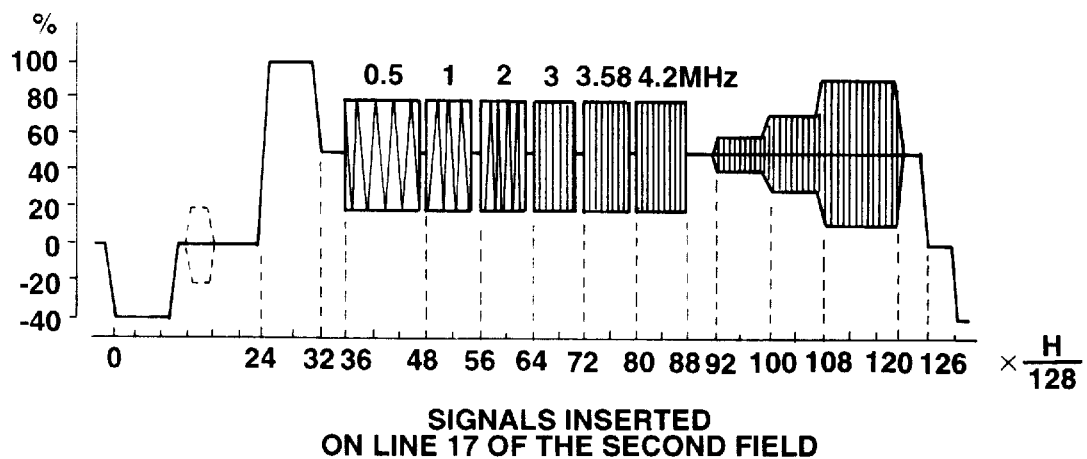
Figure 18:
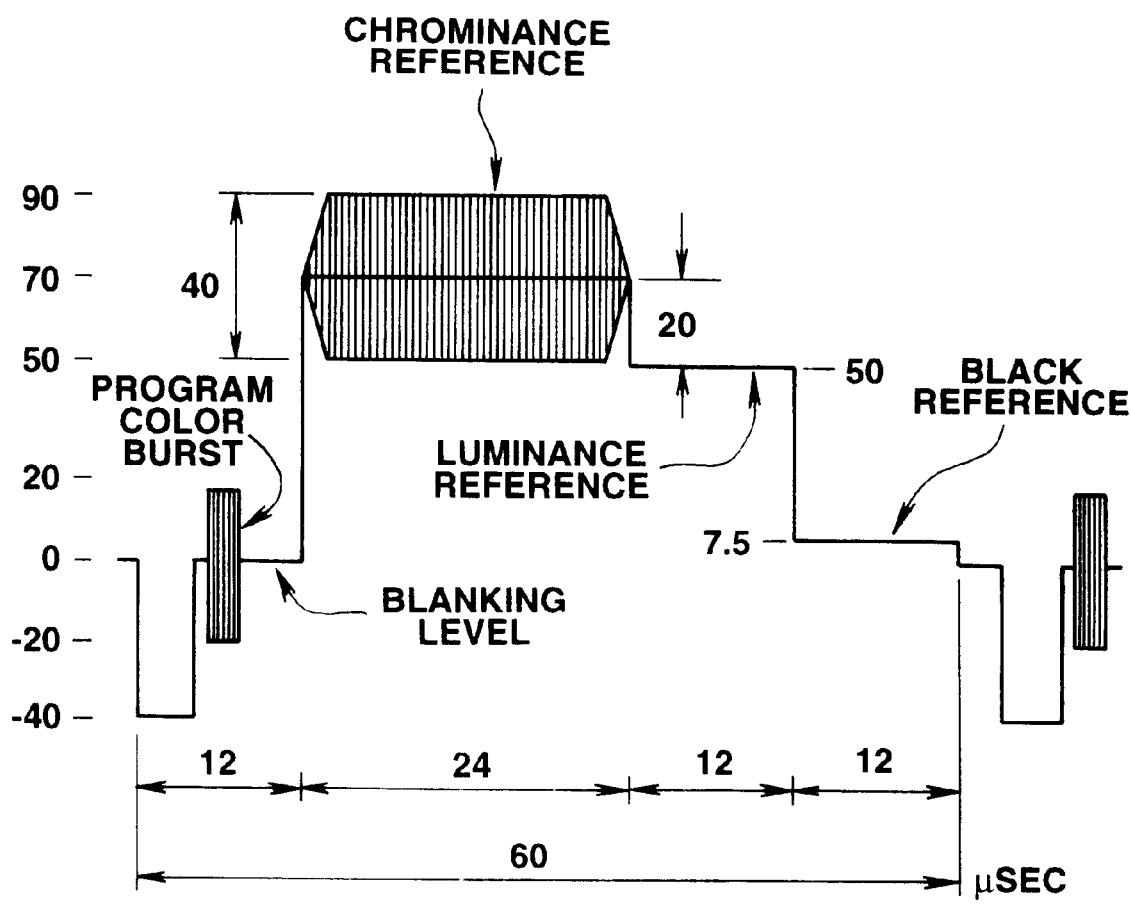
FIG. 18 is a diagram showing the VITS signal.

The present invention initially determines whether a video signal is a TV broadcast signal and, if so, retrieves the CGMS data from the AAUX, VAUX control source packs (FIGS. 14, 15). To identify a TV broadcast signal, the present invention senses signals which are indicative of the TV broadcast signal such as the Vertical Interval Test Signal (VITS) shown in FIGS. 17A and 17B; or the Vertical Interval Reference Signal (VIR) shown in FIG. 18. The VITS or the VIR signals are provided with the TV broadcast signal and, therefore, identifying these signals determines that the incoming video signal is a TV broadcast signal. It will be noted that the VITS signal is inserted in both the first and second field of a frame, as shown in FIGS. 17A, 17B, respectively. The VITS signal is inserted on line 17 of both fields in the CCIR 473 standard of the transmitted TV broadcast signal, and in the United States, the VITS signal is inserted on lines 17 and 18 because the TBC transmission in the United States may cause the VITS signal to be shifted by one line. Accordingly, the present invention searches a range of lines 16, 17 and 18 to identify the VITS signal and thereby detect the TV broadcast signal.

It will be appreciated that, unlike the digital VTR, the analog VTR records the VITS or VIR signal along with the TV broadcast signal because the analog VTR, unlike the digital VTR, does not cut off the vertical blanking interval. Problematically, such an analog recorded TV broadcast signal would be presented as an original TV broadcast signal (as opposed to a copy) to the present invention. Fortunately, the analog VTR cannot sense the high frequency, generally several Mhz, of the VITS or VIR signals. Consequently, the analog VTR smooths the high frequency VITS and VIR signals and the present invention does not erroneously detect a TV broadcast signal therefrom. Even if the present invention senses erroneously that the analog VTR output signal is an original TV broadcast signal, the present invention treats analog output signals as if they automatically have a copyright, and the analog output signal does not pose a problem to the present invention.

It will also be appreciated that video signals pre-recorded on magnetic tape or disk also contain the VBID signal or a copy-protect signal. The present invention treats such pre-recorded signal as original TV broadcast signals and automatically copyright protects those signals.

Figure 19:
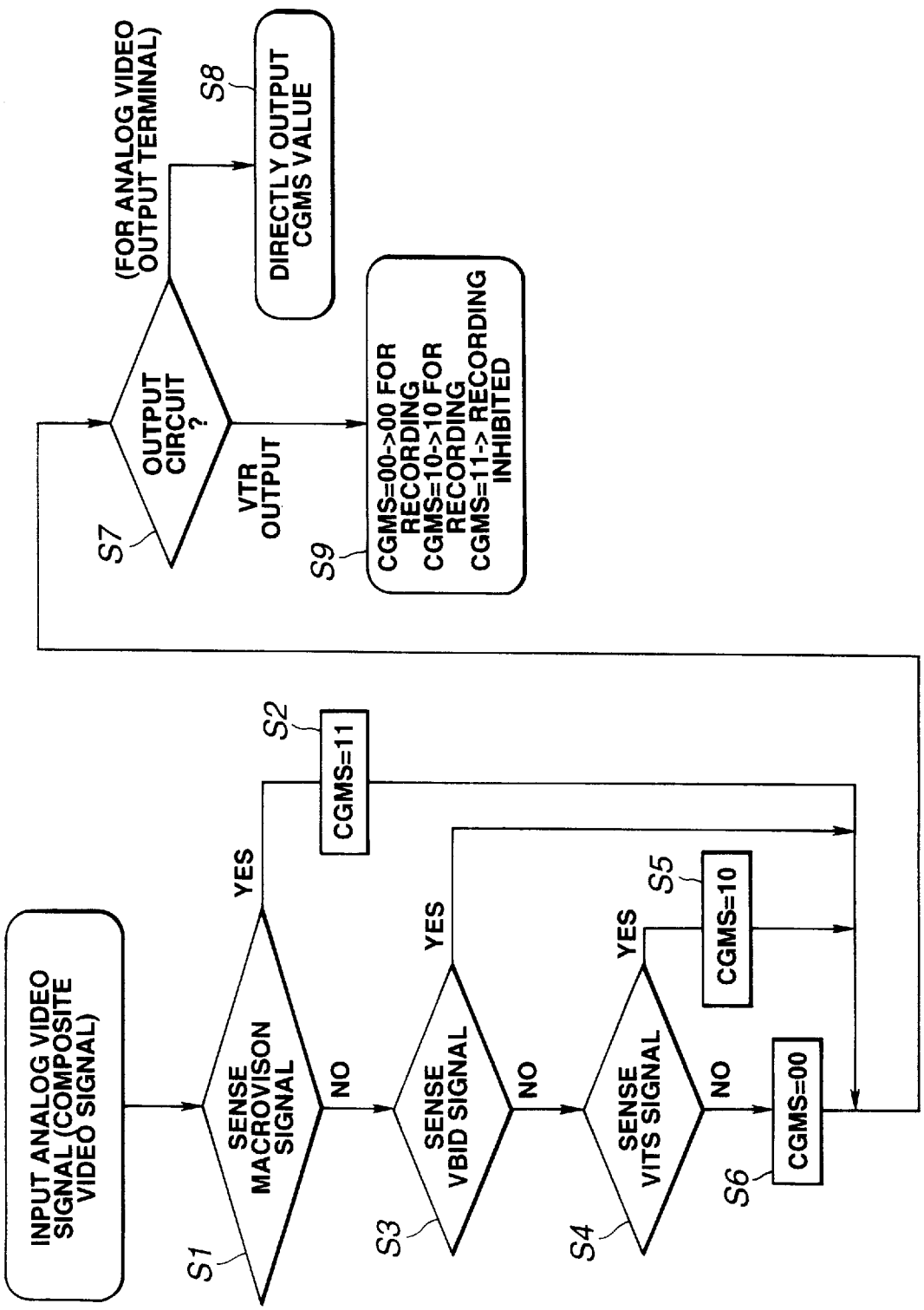
FIG. 19 is a flowchart implementing an embodiment of the present invention.

As shown in FIG. 19, the present invention when incorporated into a digital VTR, detects a TV broadcast signal and sets the CGMS therefrom. That is, when an analog video signal (composite video signal) is input, whether the present invention senses a copy-protect signal (such as the type used by Macrovision) is present in the input analog video signal in inquiry S1. If so, it is assumed the input video signal is a copy and further copying is prohibited by setting the CGMS="11" in instruction S2 (see FIG. 9).

But when no copy-protect signal is detected, the routine advances to inquiry S3 to determine if a VBID signal is present in the input analog video signal. If the VBID signal is detected, the routine determines that the input video signal is received directly from a television broadcaster, and is not pre-recorded or copied, for example. At this time, the routine advances to inquiry S7 to determine whether the received video signal is to be supplied to an analog video output or to a digital VTR output of the digital VTR. If the video signal is to be supplied to the analog video output, the routine extracts the CGMS data directly from the analog video output in step S8; otherwise the CGMS is set according to the predetermined values shown in step S9 if the video signal is to be supplied to the digital VTR output.

If neither a copy-protect signal nor a VBID signal are detected, the routine advances to inquiry S4 to determine whether a VITS signal is present in the input analog video signal. If so, the routine allows the corresponding input analog video signal to be copied once by setting the CGMS bits="10" (see FIG. 9).

When the copy-protect signal, the VBID signal and the VITS signal are not detected, the routine advances to step S6, meaning that the input analog video signal is not a copyrighted signal. In this instance, the routine sets the CGMS data="00" in step S6, indicating that the input analog video signal is not copyrighted, thereby allowing another VTR to copy the input analog video signal freely, whether this video signal is supplied to the analog output terminal or to the digital VTR output terminal.

In step S9, the routine responds to the CGMS bits to establish whether copying is allowed, once allowed or inhibited entirely. In the example of FIG. 19, when CGMS is set to "00", the copy-protect signal, the VBID signal and the VITS signal were not sensed and recording is allowed. When the CGMS is set to "10", the VITS signal was sensed and one copy is allowed; hence, the CGMS is set to "11" after recording is permitted so as to prohibit another generation. When the CGMS="11", the present invention inhibits copying entirely.

Recording Circuit

Figure 20:
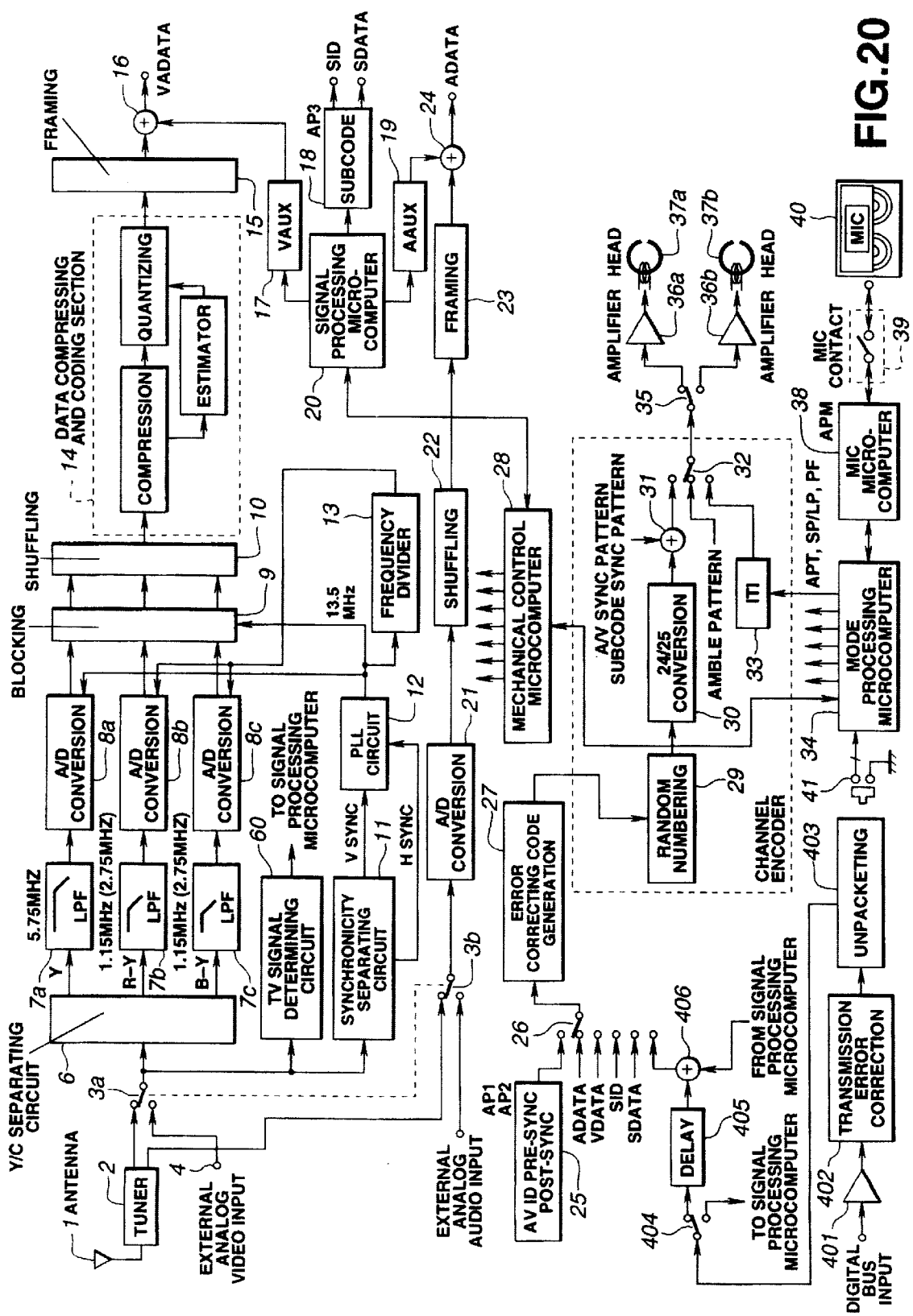
FIG. 20 is a block diagram of a recording circuit including the present invention.

A recording circuit according to the present invention is shown in FIG. 20, wherein a TV broadcast signal is received by a tuner 2, via antenna 1, where it is restored into a composite video signal and an audio signal. The restored video signal is switched through a switch 3a that switches between the restored video signal and an external analog video input signal that may be supplied to input terminal 4, to a Y/C separating circuit 6. The Y/C separating circuit separates the luminance (Y) signal from the chrominance (R-Y, B-Y) signals in the restored video signal. The separated signals are low pass filtered by low pass filters (LPF) 7a, 7b and 7c and, then, digitized by analog-to-digital converters 8a, 8b and 8c. A blocking circuit 9 forms the digitized data into blocks and a shuffling circuit 10 shuffles the blocks in preparation for data compression and coding performed by a data compressing/coding section 14. The coded data, then, is formed into sync blocks by framing circuit 15, with VAUX data added thereto by an adding circuit 16 from a VAUX circuit 17, thereby forming the VADATA output.

The video signal provided by switch 3a is coupled to a sync separating circuit 11 which separates the horizontal and vertical synchronizing signals. The separated synchronizing signals are supplied to a phase locked loop (PLL) circuit 12 to generate a clock signal on the order of about 13.5 MHz. This clock signal is supplied to A/D converter 8a as a sampling signal and is frequency divided in divider 13 by a factor of 2 or by a factor of 4 to be supplied to A/D converters 8b and 8c as a sampling signal. It will be appreciated that the luminance (Y) and the chrominance (R-Y, B-Y) components are in proportioned amounts corresponding to the 4:2:2 video format, wherein four pixels of luminance (Y) data are transmitted with two pixels of color difference (R-Y) data and two pixels of color difference (B-Y) data. Here, the 4:2:2 video format is sampled by using a 13.5 MHz sampling frequency to sample the -Luminance signal (Y) and half of that sampling frequency to sample the chrominance (R-Y, B-Y) signals.

It will be appreciated that a 4:1:1 signal of the NTSC system of 525 lines/60 Hz may be sampled, wherein the luminance signal (Y) has four pixels for every pixel of color difference signals (R-Y), (B-Y). Similarly, a 4:2:0 signal in the PAL system of 625 lines/50 Hz, may be sampled.

As an example of the frequencies of the separated luminance and chrominance signals produced by Y/C separating circuit 6, the luminance signal (Y) may have a maximum frequency of about 5.75 Mhz and the color difference signals (R-Y, B-Y) may have maximum frequencies of about 2.75 Mhz for one type of format; and the luminance signal (Y) may have a maximum frequency of about 5.75 Mhz while the color difference signals may have a maximum frequency of about 1.4 Mhz. It will be noted that the low pass filters of FIG. 20 are designed with such cut-off frequencies.

The blocking circuit 9 forms the digitized samples into, for example, 8×8 (samples×lines) blocks. The shuffling circuit 10 shuffles these blocks to effectively disperse the data in case data is lost due to head clogging or horizontal impairment of the magnetic tape. The compressing and coding section 14, which compresses and codes the shuffled blocks, includes a compression unit for compressing the blocks using discrete cosine transform (DCT) or variable length coding (VLC); an estimator unit for estimating the amount of compressed data; and a quantizing circuit to quantize the compressed data blocks with quantization co-efficients that are adjustable by the estimator unit. The quantized data are formed into frames of sync blocks by framing circuit 15 and the VAUX data supplied from VAUX circuit 17 is inserted into the frame by adding circuit 16, thereby producing output video data (VDATA).

The audio signal provided at tuner 2 is sent to a switch 3b, which selectively switches between the restored audio signal and an external analog audio signal. The selected audio signal is digitized by an analog-to-digital conversion circuit 21, a shuffling circuit 22 shuffles the digitized audio signal, and a framing circuit 23 forms frames of sync blocks, each sync block containing the shuffled audio data. AAUX data generated by AAUX circuit 19 is added to a frame by adding circuit 24 to produce output audio data (ADATA).

The VAUX and AAUX data are generated essentially by a mode processing microcomputer 34. The mode processing microcomputer interfaces with a mechanical control microcomputer 28 that controls the mechanical operations of the VTR. For example, when a user selects a special playback mode, such as fast forward, the mechanical control microcomputer controls the speed of the tape to correspond to the fast/forward mode.

A signal processing microcomputer 20 generates absolute track numbers contained in a "TITLE END " pack which is provided in a predetermined location of the accessory data (AAUX or VAUX). In addition, the signal processing microcomputer generates a title time code (TTC) which is stored in the subcode data. It will be recalled that the subcode data is employed in a high-speed search of the video program; and the title time code (TTC) is used in displaying a sub-title on a video monitor during the high-speed search.

The mode processing microcomputer 34 may be operated synchronously with the TV image frequency of 60 Hz or 50 Hz. The signal processing microcomputer 20, on the other hand, operates at much higher rates and in synchronism with the rotary drum of the VTR which rotates at a frequency of 9,000 rpm (translating to a frequency of 159 Hz).

The VAUX, AAUX and the subcode data generated by the signal processing microcomputer 20 are supplied respectively to VAUX circuit 17, AAUX circuit 19 and subcode circuit 18. The VAUX data recalled from VAUX circuit 17 is inserted into the frame generated by framing circuit 15 by adder 16, thereby forming video data (VDATA). The AAUX data recalled from the AAUX circuit 19 is inserted into the frame generated by framing circuit 23 by adding circuit 24, thereby forming the audio data (ADATA). The subcode data stored in subcode circuit 18 is generated as SID data and the AP3 of the ID section and the data pack SDATA.

The foregoing describes generating the accessory data. The recording of that data will now be described. A switch 26 selectively switches between inputs of AV ID pre-sync/post-sync data produced by a suitable generator 25, the ADATA formed by adding circuit 24, the VDATA formed by adding circuit 16, the SID and the SDATA from subcode circuit 18, and the digital bus data. Switch 26 is timed to switch between these inputs in order to form audio, video and subcode areas, such as the audio area shown in FIG. 1. For example, the pre-sync/post-sync data generated by the AV ID pre-sync/post-sync circuit 25 is selected initially by switch 26. Then, switch 26 forms sync blocks for each area by switching between the audio data (ADATA), the video data (VDATA), the SID and the subcode data (SDATA) inputs. In addition, switch 26 selectively switches to the digital bus input for receiving information from a digital bus. The details of the processing of the digital bus will be described in more detail below with reference to FIG. 33.

The data selected by switch 26 is sent to an error correcting code generation circuit 27 for generating the parity codes (C1, C2) shown in FIG. 12A. The selected data and parities generated by the error correcting code generation circuit are sampled by a random sampling circuit 29 in order not to shift the data to be recorded. A 24/25 conversion circuit 30 performs 24-bit to 25-bit conversion to remove d.c. components from the data; and an adding circuit 31 adds sync pattern data (FIG. 11A) to the data converted by the 24/25 conversion circuit 30. Although not shown, the 25-bit data may be further subjected to (1/1−D2) coding by a partial response class 4 (PR4) technique.

A switch 32 selectively switches between the data generated by adding circuit 31, an amble pattern pre-formed by the VTR, and insert and track information (ITI) circuit 33 to form the data on a track of the record medium according to the tape format of FIG. 1. Initially, switch 32 switches to the ITI input terminal at the beginning of each track to form therein the ITI data. Switch 32, next, selects the amble pattern input terminal to input the amble pattern. Switch 32, then, selects the audio, video or subcode data; and then another amble pattern is formed on the track by selectively switching switch 32 to its amble pattern input terminal.

The ITI data is stored in ITI data circuit 33 by mode processing microcomputer 34. The mode processing microcomputer generates the ITI data from the application ID (APT), the SP/LP setting set by a user and the pilot frame data (PF). In addition, the application ID can be determined from the application ID (APM) from the MIC mounted within a tape cassette 40. The MIC data is retrieved by an MIC microcomputer 38 through a MIC contact 39 from the MIC of the tape cassette 40.

After the information is arranged into the tape format of FIG. 1 by switch 32, the information is ready to be recorded on the record medium. Dual recording heads 37a, 37b, (FIG. 20) of the VTR record the information alternately in different tracks of the record medium. A switch 35 alternately switches the information to the dual recording heads according to an alternating sequence in order to alternately record the information of FIG. 1 into successive tracks. A first amplifier 36a amplifies the information switched to the first head 37a and a second amplifier 36b amplifies the information switched to the second head 37b.

Recording Circuit Example Recording Accessory Data

As an example of the operation of the recording circuit described with reference to FIG. 20, the recording of the video accessory data (VAUX) will be explained. While this example pertains to the VAUX data, it will be appreciated that the recording of the AAUX data follows the same operations since these accessory data items have the same data structures.

Figure 21:
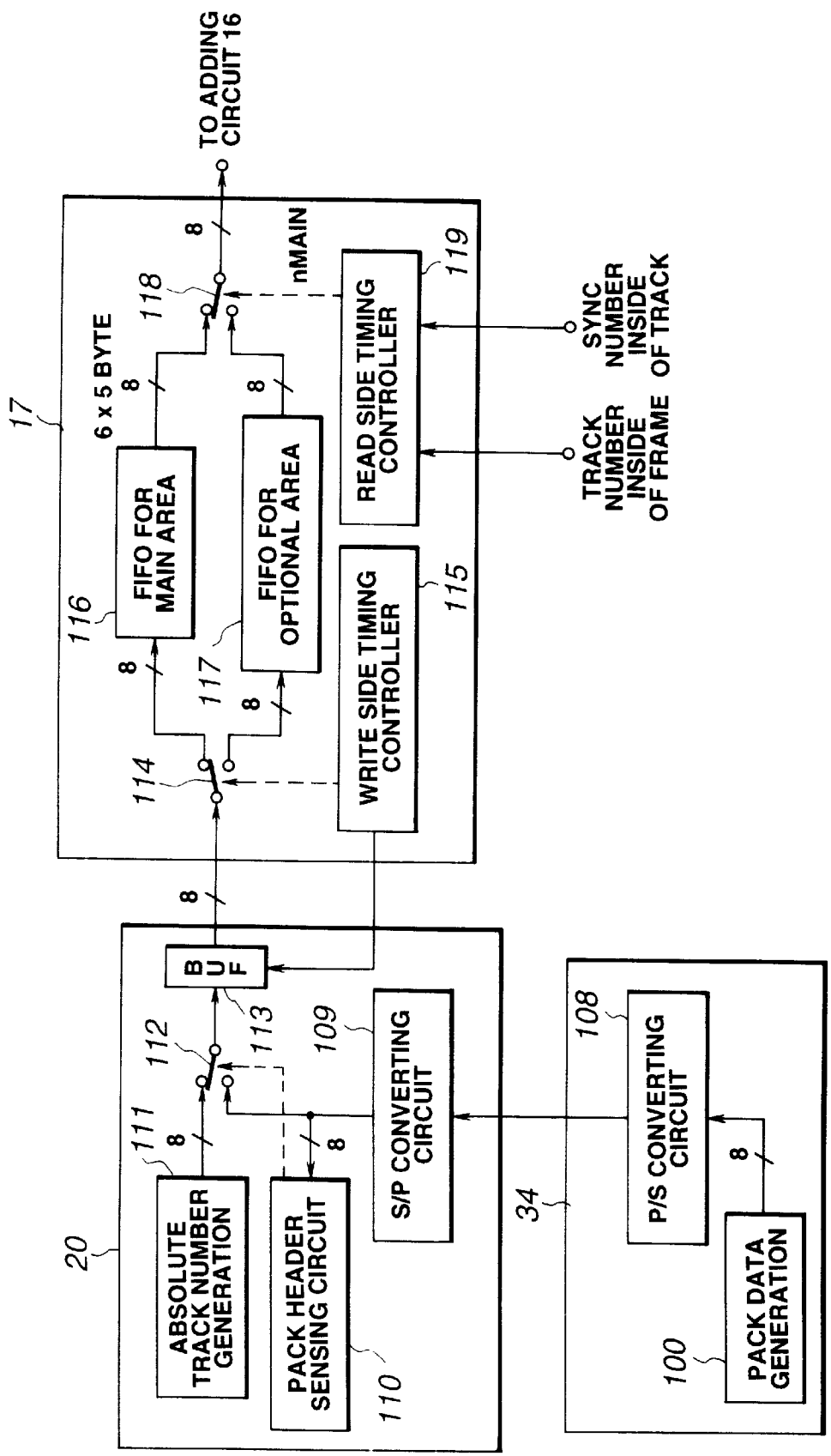
FIG. 21 is a block diagram of a VAUX recording circuit included in the recording circuit of FIG. 20.

The mode processing microcomputer 34 shown in more detail in FIG. 21 generates the VAUX pack data. A pack data generation circuit 100 generates the pack data shown in FIG. 15 as 8 parallel bits. These 8 parallel bits are converted into a stream of serial bits by a parallel/serial converting circuit 108 for transmission from the mode processing microcomputer to signal processing microcomputer 20 via mechanical control microcomputer 28 according to an intra-microcomputer communication protocol.

After transmission of the serial bits, serial/parallel converter 109 of the signal processing microcomputer converts the transmitted serial bits back into 8 parallel bits of pack data. These 8 bits of parallel pack data are sent to both a pack header sensing circuit 110 and a switch 112. The pack header sensing circuit senses the pack header, for example, from the byte PC0. The pack header sensing circuit retrieves the pack header located at the beginning of each pack of five bytes and determines therefrom whether the pack data needs an absolute track number. When an absolute track number is needed, the pack header sensing circuit causes switch 112 to switch to an absolute track number generation circuit 111 and receive therefrom the needed absolute track number. This absolute track number determines the fixed location on the record medium for the packs and the track number data is provided in PC1 or PC2 or PC3. Normally, switch 112 selects the pack data and pack header from serial parallel converter 109 for storage in buffer 113, and when necessary, the absolute track number is supplied by the switch to the buffer.

Preferably, signal processing microcomputer 20 is run by software in order to avoid costly use of ASICs (Application Specific Integrated Circuit) hardware. For example, the function of serial/parallel converting circuit 109 is performed by a serial I/O port of the signal processing microcomputer. Sensing the pack header can be achieved by a software program run by the signal processing microcomputer instead of using a pack header sensing circuit embodied in hardware. Similarly, absolute track number generation circuit 111 and switch 112 are replaced by software programs run by the signal processing microcomputer. Buffer 113 may be constructed as a RAM of the signal processing microcomputer. In practice, the signal processing microcomputer is sufficiently fast to process the data packs using the above-described software, and costly ASIC hardware may be avoided.

The pack data stored in buffer 113 is, then, sent to VAUX circuit 17 at the command of a write timing controller 115. The VAUX circuit distinguishes between the main area (FIG. 13) pack data (which stores mainly essential items such as the sampling frequency and number of quantizing bits) and the optional area data. The write timing controller controls switch 114 to switch the first half of 6 packs, where the main area information is carried, to a FIFO buffer 1165. After the main area pack data is coupled to FIFO 116, the write timing controller controls switch 114 to switch the optional area pack data to a FIFO buffer 117 for the remaining 390 packs. Preferably, the FIFO 116 for the main area pack data has a capacity of 30 bytes, while the FIFO 117 for the optional area pack data has a capacity of 1950 bytes for a 525 lines/60 Hz system and a volume of 2340 bytes for a 625 lines/50 Hz system.

The data packs stored in FIFOs 116, 117 are recorded on the record medium as the VAUX data of the video signal. The recording of the VAUX data is controlled by a read timing controller 119 which controls a switch 118 to selectively switch between the FIFO 116 for the main area when the main area pack data is recalled therefrom and the FIFO 117 for the optional area when the remaining optional area data packs of the VAUX data is recalled therefrom. The read timing controller performs this switching on the basis of a track number of a frame and a sync number of a track within that frame. In this manner, the main area and the optional area pack data are read from FIFOs 116, 117 and sent to adding circuit 16 to be inserted into the frame of video data generated by framing circuit 15.

A specialized data pack, such as a TR pack includes video picture information relating to, for example, PAL and EDTV-2 television standards. A TR pack may be designated by a value of 66h in the pack header PC0, for example. The byte PC1 is used to indicate the type of data that follows in bytes PC2 to PC4. Generally, a single TR pack is included with each main area (FIG. 13). However, if additional TR packs are included in, for example, the sixth data pack of the main area, this additional data also is written to the FIFO 116 for the main area. Similarly, a closed caption pack that contains closed captioned data for the hearing impaired in the main area also is written in the FIFO 116 for the main area. Preferably, the additional pack data (TR pack or closed caption pack) is written to the FIFO 116 for the main area for each track pair.

Figure 22A:
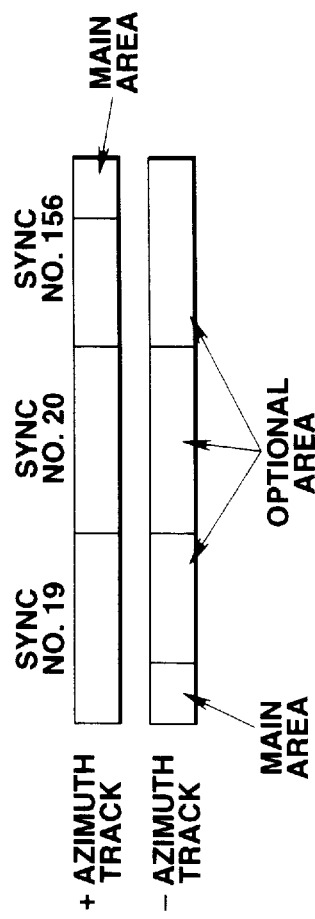
FIGS. 22A and 22B are diagrams showing main and optional areas for VAUX data.
Figure 22B:
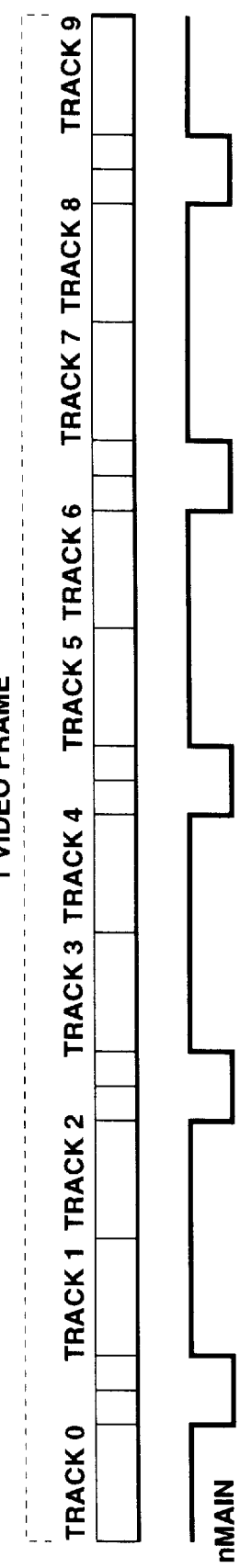

The VAUX data is inserted by adding circuit 16 into, for example, the video sync blocks 19, 20 and 156 shown in FIG. 22A in the frame generated by framing circuit 15. It will be noted that the main area is located at the second half of video sync block 156 on+azimuth track and in the first half of the video sync block 19 for−azimuth track. FIG. 22B shows ten tracks (TRACK 0 . . . TRACK 9) which are used to record one video frame, wherein it will be noted that the main area located at the first half of video sync block 19 and at the second half of block; 156 form adjacent pairs when the tracks are alternately sequenced. The present invention provides an nMAIN signal that is timed to generate a pulse for each adjacent pair of main area data packs. The nMAIN signal is generated by read timing controller 119 (FIG. 21) to control switch 118 to output the main area pack data from the FIFO 116 during the second half of video sync block 156 and the first half of video sync block 19 during the low level state "L" of the nMAIN signal.

Generally, a single TR pack or a single closed caption pack is recorded as the sixth pack of the main area data packs and the VTR records the data stored in the FIFO 116 for the main area ten times for a 525 line/60 Hz (12 times for a 625 line/50 Hz) video system as shown in FIG. 13. On the other hand, when a plurality of TR packs or closed caption packs are recorded, the data stored in the FIFO 116 for the main area is read twice during the low level state "L" of the signal (nMAIN) because such data are written in the FIFO 116 for each track pair; that is, the same data are written into each track. When the signal (MAIN) is set to the high level state "H", the read side timing controller causes FIFO 117 for the optional area to output the optional pack data.

VAUX Pack Data Generation Circuit

The VAUX pack data generation circuit 100 (FIG. 21) of mode processing microcomputer 34 (FIG. 20) will be described in more detail with reference to FIG. 23. The VAUX pack data generation circuit includes a data collecting and generating circuit 101 for the main area packs and a data collecting and generating circuit 103 for the optional area packs.

The data collecting and generating circuit 101 for the main area packs receives data such as CGMS, CP, DISP and CLOSED CAPTION data from a digital bus or a tuner and generates the data groups shown in FIG. 24 therefrom. These data groups are preferably inserted into reserved fields of the main data pack. A pack header (60h . . . 65h) is inserted into byte 0, for example, of a main area data pack by control of a switch 102. The pack header and the data group generated by the data collecting and generating circuit for the main area data packs are coupled to a parallel/serial converter 108 through a switch 106.

The data collecting and generating circuit 103 for the optional area data packs receives, for example, TELTEXT data and PROGRAM TITLE data and generates therefrom the data to be inserted into the optional area packs. The optional area packs have a pack header set by a pack header setting circuit 104 which is selectively inserted into byte 0, for example, of the optional data pack by operation of switch 105. The resulting optional pack data is coupled to parallel/serial converter 108 through switch 106.

A timing adjusting circuit 107 controls the timing of switches 102, 105 and 106 to couple the ma n and optional area pack data to the parallel-to-serial converter 108. By operation of switch 106, the main area pack data and its pack header inserted therein is output to signal processing microcomputer 20 (FIG. 20), as are the operational pack data with its pack header inserted therein. The signal processing microcomputer, then, stores the VAUX pack data in VAUX circuit 17 for later insertion into the frame by adding circuit 16.

Preferably, VAUX pack data generator 100 is a processor which employs software to generate the main area and optional area pack data. In this preferred embodiment, the parallel/serial converter is one of the serial I/O ports of the mode processing microcomputer 34 (FIG. 20). It is also preferred that software programs perform the functions of: data collecting and generating circuit 101 for the main area; switch 102 for determining a pack header for the main area pack data; data collecting and generating circuit 103 for the optional area; pack header setting circuit 104 for setting a pack header of the optional area pack data; switch 105 which forms the optional area pack data from the optional area pack header and the optional area pack data; switch 106 which selects the main area and optional area pack data; and timing adjusting circuit 107 which controls switch 106. With this preferred embodiment, the VAUX pack data generator 100 is embodied as a software-run processor and, as a result, costly ASIC hardware is avoided.

Figure 23:
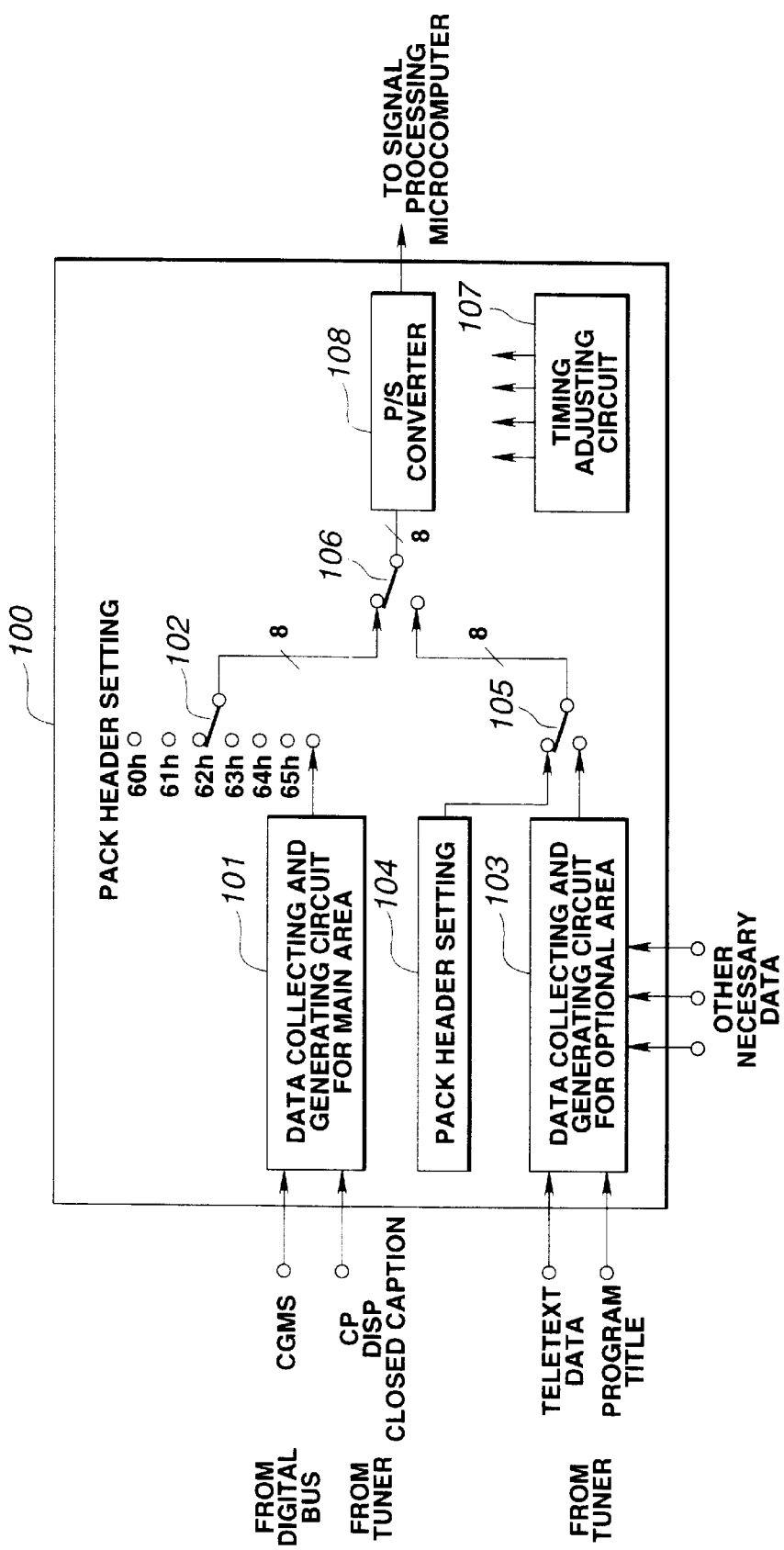
FIG. 23 is a block diagram showing a VAUX pack data generator.
Figure 25:
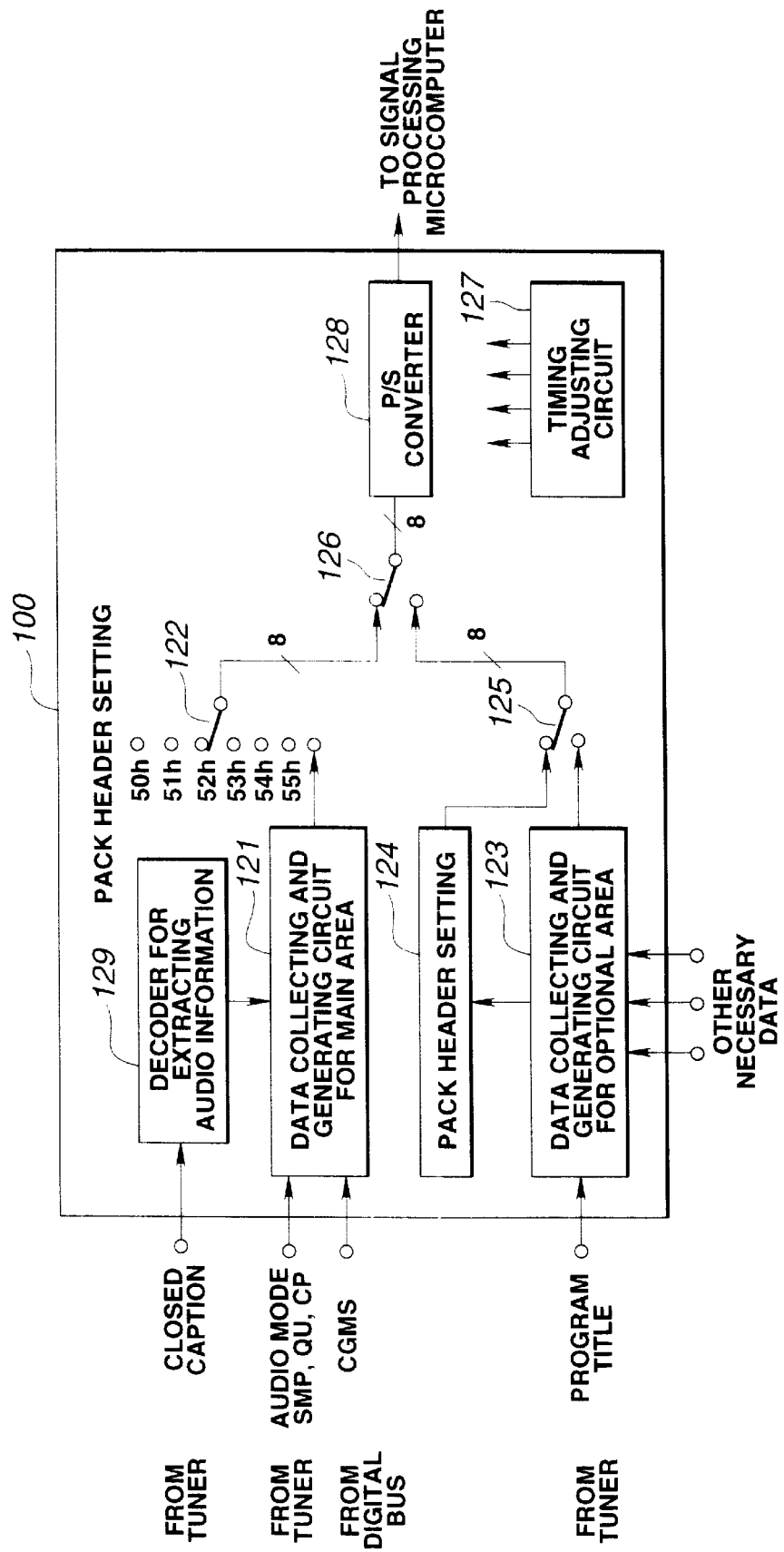
FIG. 25 is a block diagram showing an AAUX pack data generator.

The AAUX pack data generator included within mode processing microcomputer 34 is shown in FIG. 25 and is similar to the VAUX pack data generator of FIG. 23. The similarities between these circuits will not be discussed here, but are apparent from the description of the VAUX pack data generator of FIG. 23. The AAUX pack data generator of FIG. 25 generates AAUX pack data and the data input thereto relates to audio data. Thus, one difference from the VAUX pack generator is that the types of data processed by AAUX pack data generator are audio types. For example, the program title for the optional area is the title of a music program, for example, a digital audio PCM program. Another difference from the VAUX pack data generator of FIG. 23 is that the AAUX pack data generator of FIG. 25 further includes a decoder 129 for extracting closed caption data normally carried in the vertical blanking period of a received video signal. Once the closed caption information is extracted from the vertical blanking period, it is treated in the same manner as the data of the VAUX pack data generator of FIG. 23.

A data collecting circuit 121 for the main area data packs receives several kinds of data such as CGMS, AUDIO MODE, SMP, QU and CP from a digital bus and from a tuner and generates various kinds of data packs as indicated in FIG. 26. The generated data packs are arranged in a main pack and pack header is added thereto by a switch 122. The resulting data pack is applied to a parallel/serial converter 128 through a switch 126.

A data collecting circuit 123 for the optional area data packs receives data such as a program title from the tuner. A pack header is set by a pack header setting circuit 124 and is added to the pack data through a switch 125. Then, the resulting pack is applied to converter 128 through switch 126. The timing of switches 122, 125 and 126 is controlled by a timing adjusting circuit 127.

Similar to the VAUX pack generator, the converter 128 preferably is a serial I/O port of the microcomputer; the data collecting circuit 121, the switch 122, the data collecting circuit 123, the pack header setting circuit 124, the switches 125 and 126, and the timing adjusting circuit 127 are implemented by software programs run in the microcomputer 34.

Data Pack Recording

The recording of the accessory data has been discussed above and a more detailed description of the recording of the pack data will now be described in conjunction with FIG. 20. The AV ID pre-sync/post-sync circuit 25 generates synchronizing signals for synchronizing the sync blocks of the data packs. These synchronizing signals include application IDs (AP1, AP2), a pre-sync and a post-sync of the audio/video (AV) signal.

Switch 26 selectively switches between these synchronizing signals, the audio data (ADATA), the video data (VDATA), the SID, and the subcode data (SDATA) to generate the areas of sync blocks shown in FIG. 10. These signals are coupled to error correcting code generation circuit 27 which adds the parities C1, C2 to the sync blocks (for example, as shown in FIG. 12A).

A channel encoder receives the ECC-encoded signals from error correcting code generation circuit 27 and performs a random-sampling operation thereon using random sampling circuit 29 which does not shift the recording data. Then, 24/25 converter 30 performs 24 to 25 conversion to convert the 24 bits of the sampled data into 25 bits. Advantageously, the 24 to 25 conversion removes a DC component from the recorded data. The 24 to 25 conversion may include Partial Response Class 4 (PRC4) coding process ($1/1-D^2$) which prepares the data for magnetic recording.

The channel encoder, then, arranges the converted data into the tape format of FIG. 1 for recording on the record medium. Since each track begins with Insert and Track Information (ITI), switch 32 selects the ITI circuit 33 to receive the ITI area data therefrom. Switch 32, then, selects the amble pattern followed by the data converted by the 24/25 conversion circuit 30. The data arranged into the track format shown in FIG. 1 is further arranged into data areas, such as the audio area shown in FIG. 10, by combining the audio data from converter 30 with the A/V sync pattern and the subcode sync pattern in adder 31. Switch 35, then, switches again to the amble pattern, thereby bounding each data area by an amble pattern in accordance with the tape format shown in FIG. 1.

The ITI data format including the pre-amble, the post-amble and the Start Sync Block Area (SSA) may be internally generated by ITI circuit 33. The Track Information Area (TIA) which contains the application ID (APT) indicating an arrangement of the data packs, the standard-play/long-play setting (SP/LP), and the pilot frame (PF) are dependent upon external information and, therefore, are provided externally to the ITI circuit 33 from, for example, mode processing microcomputer 34.

The mode processing microcomputer 34 interfaces with the user and generates mode information from user-selected settings. Switch 41 represents an array of switches selectable by the user for setting the modes of the mode processing microcomputer. The array of switches 41 may include, for example, an SP/LP recording mode setting switch for setting the mode processing microcomputer to a standard-play or a long-play mode. The mode processing microcomputer senses the SP/LP recording mode set by the array of switches 41 and generates the SP/LP data therefrom.

The mode processing microcomputer 34 further controls the mechanical operations of the VTR from the switch array 41 settings. For example, if the user sets the SP/LP recording mode from the standard-play (SP) to the long-play (LP), the mode processing microcomputer causes mechanical control microcomputer 28 to reduce the speed of the tape medium to correspond to the slower, long-play speed.

The mode processing microcomputer also generates the application ID (APT) which is sent to the ITI circuit 33 for insertion into the TIA area of each track. The application ID (APT) may be generated by the settings of the array of switches 41 or may be determined by the application ID (APM) of the Memory IC (MIC), a memory housed in the tape cassette 40. An MIC contact 39 couples the MIC data to MIC microcomputer 38, which generates pack data from the APM and sends this pack data to the ITI circuit via the mode processing microcomputer.

Figure 27:
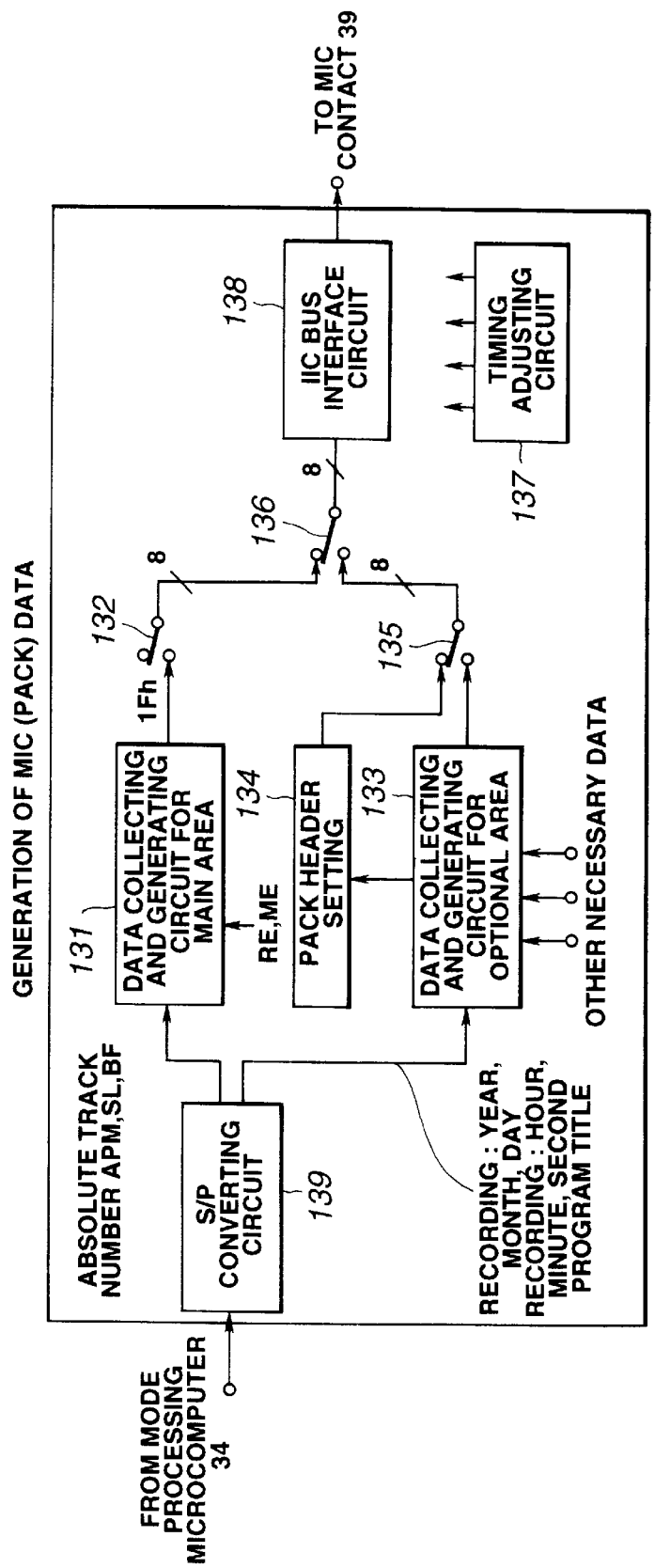
FIG. 27 is a block diagram of a MIC microcomputer.

Alternatively, the application IE) (APT) generated by the mode processing microcomputer 34 may be inserted into the MIC of the cassette 40 as the application ID (APM) of the MIC. A more detailed view of the MIC microcomputer is shown in FIG. 27, wherein the MIC microcomputer 38 processes the application ID (APT) from mode processing microcomputer 34 and stores the processed application ID (APT) in the MIC through the MIC contact 39. As shown, a serial/parallel converting circuit 139 converts the serial stream of data bits from the mode processing microcomputer into, for example, eight parallel bits. The MIC microcomputer processes these bits into data packs including main area data packs and optional area data packs.

A data collecting and generating circuit 131 for the main area packs collects the essential information from the mode processing microcomputer and sends this essential information to switch 132. The data collecting and generating circuit for the main area packs is responsive to an MIC Error (ME) flag, generated by MIC microcomputer 38, and a Recording proofed Events Exists (RE) flag also generated by the MIC microcomputer.

The switch 132 is timed by the MIC microcomputer to switch to a pack header terminal to supply the pack header "1Fh" as the byte PC0 for a TITLE END pack. During the remaining bytes of this data pack, switch 132 switches to the data collecting and generating circuit for the main area packs to receive the main area pack data for writing to the MIC.

The pack data of the main area includes essential items of the application ID (APM) such as: the address used by the VTR to store the retrieved APM; the ME flag stored in a CASSETTE ID pack; and the TITLE END pack. These essential items are generated internally by the MIC microcomputer. Other essential items stored in the main area packs are generated by mode processing microcomputer 34 including an absolute track number, and SL and BF flags generated by signal processing microcomputer 20. Thus, the main area data is arranged in the MIC at a timing provided by the MIC to have a pack header 1Fh (written as the TITLE END pack, for example) followed by the main area data generated by data collecting and generating circuit 131 for the main area data packs.

Optional area pack data is collected and sent to switch 135 by a data collecting and generating circuit 133 for the optional area packs. Optional area pack data includes, for example: time information such as the year:month:day and hour:minute:second of recording; and a program title. The user may select this optional area data using the array of switches 41 whose settings are sensed by the mode processing microcomputer 34. In operation, switch 135 initially switches to receive a pack header from pack header setting circuit 134, and then switch 35 switches to the data collecting and generating circuit 133 for receiving therefrom the optional area data.

The main area pack data including the pack header 1Fh and the optional area pack data including the pack header from pack header setting circuit 134 is sent to an IIC bus interface circuit 138 via switch 136. A timing adjusting circuit 137 controls switches 132, 135 and 136 to alternately select between the main and optional area pack data, thereby synthesizing the main and optional area packs. The IIC bus interface circuit interfaces the main and optional area pack data synthesized by switch 136 according to a communication protocol of the MIC. In this manner, the application ID from mode processing microcomputer 34 is formed into pack data and sent to the MIC for storage.

Preferably, the MIC microcomputer 38 is a processor which performs the application ID processing using software programs. The data collecting circuit 131 for the main area and the data collecting circuit 133 for the optional area preferably supply data to a RAM internal to the MIC microcomputer. With this preferred embodiment, costly ASIC hardware can be avoided.

Additionally, the MIC may include Table Of Contents (TOC). The TOC is useful for organizing the recorded data, such as the name of different video programs on the tape. The recording locations are provided by the VTR, but may also be generated by the MIC microcomputer and stored in the TOC if the recording locations are not available from the VTR. Similarly, other information generally provided by the VTR can be generated by the MIC microcomputer and stored in the TOC until the VTR provides this information.

The mode processing microcomputer 34 generates the application ID (APT) and forwards this information to the ITI circuit 33. Switch 32 selects the ITI data from the ITI circuit at the beginning of each track, followed by amble patterns and, then, the audio, video and subcode data; thereby forming tracks of information on the tape with the format of FIG. 1 for recording on the record medium. Switch 35 alternately switches between the amplifiers 36a and 36b of dual heads 37a and 37b, respectively. The dual heads 37a and 37b alternatively record the track information formed by switch 32 on successive tracks of the record medium (not shown) which correspond to the plus and minus azimuth tracks shown in FIG. 22A.

In this manner, the recording circuit of FIG. 20 records the audio, video and subcode data on tracks of the record medium. In practice, the operations performed by the recording circuit are executed chiefly by the mode processing microcomputer 34 in association with the mechanism control microcomputer 28, the signal processing microcomputer and the ICs in charge of the operating components.

TV Signal Determining Unit

Figure 28:
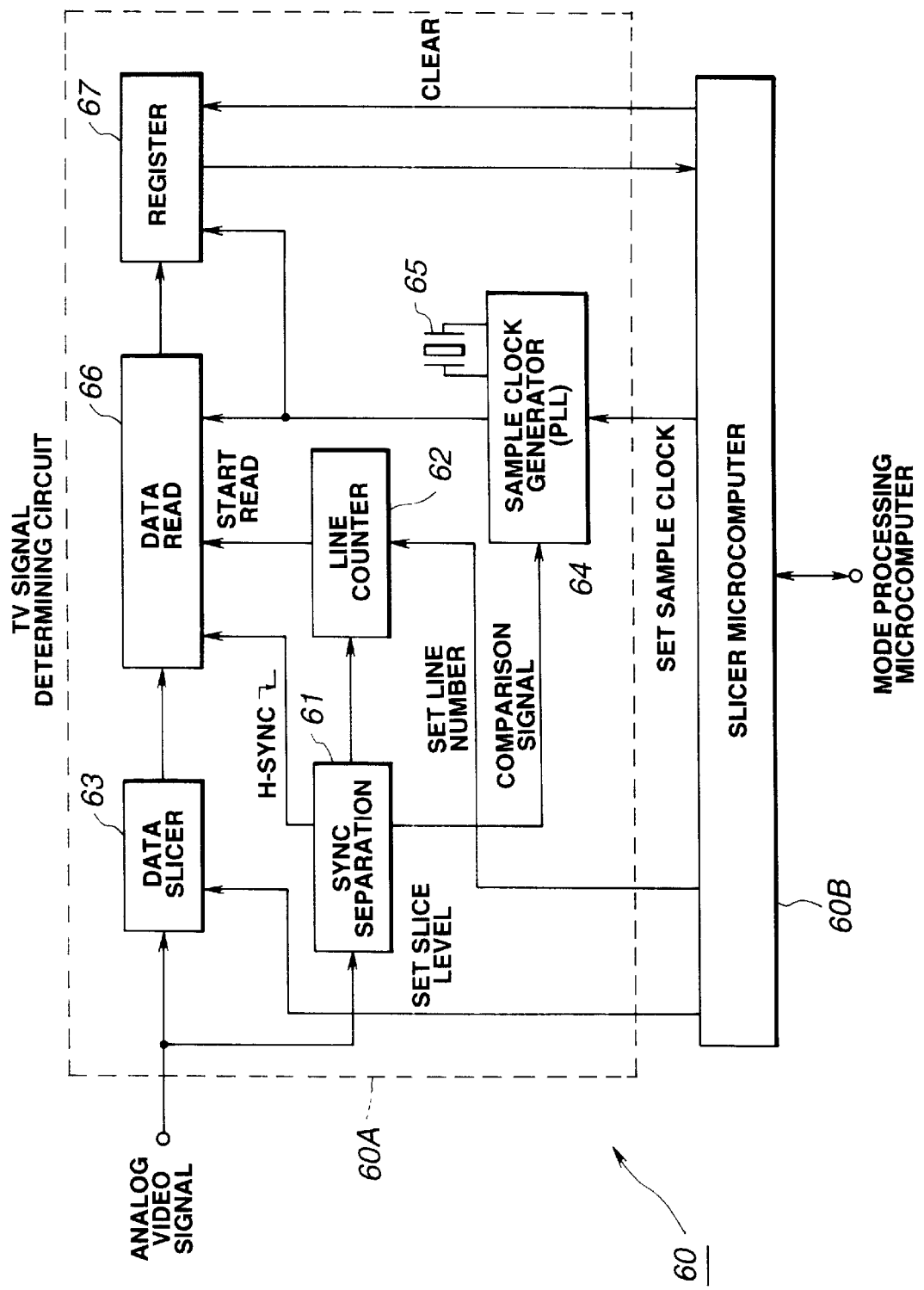
FIG. 28 is a block diagram of a TV signal determining circuit.

The TV signal determining unit 60 of FIG. 20 operates to determine whether a composite video signal and is a TV broadcast signal and is shown in FIG. 28. The composite video signal is switched by switch 3a (FIG. 20) to the TV signal determining circuit. For purposes of example, the composite video signal is treated as an analog video signal having lines formed within two fields (odd and even); such a signal is typical of a PAL or a EDTV-2 video signal. A sync separation circuit 61 senses the vertical and horizontal synchronizing signals from the composite video signal. A line counter 62 counts the current line number of the composite video signal by incrementing a counter when the horizontal synchronous signals are sensed by the sync separation circuit. The line counter generates a START READ command when it senses line 17 of the composite video signal because this line includes the VITS signal (FIGS. 17A, 17B) that indicates the presence of a TV broadcast signal. It will be recalled that the TBC of the United States transmission system shifts line 17 to either line 16 or line 18. Therefore, it is desirable in the present invention to search for the VITS signal in these lines.

The composite video signal is sent to a data slicer 63 of the TV signal determining circuit to convert the composite video signal from an analog video signal to a 1-bit digital signal. For example, if the analog video signal exceeds a threshold slice level, the data slicer generates a high level value of "1". On the other hand, if the analog video signal does not exceed the threshold slice level, the data slicer generates a low level value of "0". Typically, the VITS signal indicative of the TV broadcast signal in the second field of FIG. 17B has a mean value of approximately 60%. Accordingly, it is preferred to set the slice level to approximately 70% to detect with assurance the VITS signal in the second field.

Since the composite video signal is continuous, data slicer 63 generates a stream of 1-bit digital values. These 1-bit digital values are sent to a data-read circuit 66 which reads this stream of 1-bit digital values when line 16 is sensed, at a sampling rate determined by sampling clock generator 64. When line counter 62 senses lines 16 to 18 of the composite video signal, the line counter issues a START READ command to the data read circuit to cause the data read circuit to read the stream of 1-bit digital values generated by data slicer 63 for these lines. In this manner, the data read circuit reads the stream of 1-bit digital values generated by the data slicer for lines 16, 17 and 18 at the sampling rate provided by the sample clock generator and the data read circuit sends the read bits to a register 67.

A slicer microcomputer 60B senses that a stream of bits is registered by register 67 and concludes therefrom that the data slicer has sensed the VITS signal of the TV broadcast signal. In addition, the slicer microcomputer sets the slice level of the data slicer to a level which will accurately sense the VITS signal. Preferably, the slice level is set to 70% to detect, for example, the VITS signal with a mean value of 60% in FIG. 17B. The slicer microcomputer further selects the line numbers sensed by line counter 62. It is preferred that the slicer microcomputer selects line numbers 16 to 18 since the VITS signal may occur in any of these lines according to different broadcasting systems. The slicer microcomputer additionally selects the sampling frequency of the sampling clock generator to sample the data read by data read circuit 66 at a sampling rate sufficient for detecting the VITS. In addition, the slicer microcomputer resets the register 67 by issuing a CLEAR command thereto, for example, as controlled by mode processing microcomputer 34.

Sample Clock Generator

The sample clock generator 64 generates the sampling clock at the sampling frequency selected by the slicer microcomputer. A phase locked loop (PLL) circuit is provided within the sample clock generator for matching the phase of the generated sampling clock to the phase of the composite video signal received by the TV signal determining circuit 60. A comparison signal derived from the horizontal and/or vertical sync signal is generated by sync separation circuit 61 to which the PLL matches the phase of the sampling clock. For the purpose of phase matching, the sampling clock generator generates a sync signal having regular intervals. Such a sync signal may be generated by thinning serrated pulses and equivalent pulses in the vertical blanking period from the horizontal sync signal obtained by the sync separation circuit 61. The PLL circuit compares the phase of the comparison signal to an oscillation signal generated by, for example, a crystal oscillator 66 or, alternatively, by an inexpensive LC circuit. The comparison is made by frequency-dividing the oscillation signal and comparing the phases of each of the frequency-decoded pulses to the comparison signal, whereby the PLL sketches the phase of the sampling clock signal generated by sample clock generator 64 to the phase of the received horizontal (or vertical) sync signal.

The sample clock generator 64 may be made more stable by using both the vertical sync signal and the horizontal sync signal for comparison. With this arrangement, the PLL locks in both a one-line horizontal period and, at the same time, locks the one-frame (or one-field) vertical period. With this preferred embodiment, clock variations caused by a large swell in the period (i.e., a low frequency) are prevented.

Preferably, data read circuit 66 is timed to read on the leading edge of the horizontal sync signal provided by sample clock generator circuit 64. In this manner, the 1-bit stream of the VITS signal generated by data slicer 63 is read by data read circuit 66 at the sampling frequency of sample clock generator circuit 64 and stored in register 67.

It will be appreciated that the sampling frequency selected by slicer microcomputer 60B should be twice the frequency of the signal sampled in order to reconstruct the sampled signal without aliasing in satisfaction of Nyquist's theorem. If the preferred sampling clock frequency is 128/H, the value "0" is produced at samples 1 to 24, the value "1" is produced at samples 25 to 32, and the value "0" is produced at samples 33 to 36.

Frequency-Dividing Method

The mode processing microcomputer 34 is occupied with operations concerning the recording circuit of FIG. 20 and delegates control over the TV signal detecting circuit of FIG. 28 to slicer microcomputer 60B. The slicer microcomputer sets the sampling frequency by setting a dividing value of the feedback loop in the PLL of sample clock generator 64. Since the slicer microcomputer is a computer processor, it is preferred that the method of frequency-dividing is embodied in software to avoid using costly ASIC hardware.

An example of a preferred frequency-dividing method is described with reference to FIG. 28. Let it be assumed that the sampling clock to be frequency-divided is a digital value with: bits 1 to 24 set="0"; bits 25 to 32 set="1"; bits 33 to 36 set="0". Hence, the sampling clock may appear as the string "1100011000". It will be appreciated that the number of "1" s in the repetitive string is not equal to the number of "0" s because the slice level of preferably 70% is above the mean average (60% as shown in FIG. 17B).

It is preferred that the sampling frequency is selected as high as possible in order to obtain many samples thereby increasing the accuracy of identifying the VITS signal. However, increasing the sampling frequency is not practical because the increase in samples is impractically large for register 67 to handle. Accordingly, the number of samples is maintained at manageable levels by detecting a portion of the VITS signal. For example, the VITS signal comprises sinusoidal waves at 0.5 MHz, 1 MHz, 2 MHz, 3 MHz, 3.58 MHz and 4.2 MHz; and the present invention detects the sinusoidal waves up to 1 MHz, thereby ignoring the samples in other frequencies and reducing the number of samples.

Detection accuracy is increased by detecting the VITS signal in, for example, 10 consecutive frames. The detection result is supplied to data collecting and generating circuit 101 (FIG. 23) for the main area packs and switch 102 selects this detection result during the main area data packs. That is, the detection result indicating the presence of a TV broadcast signal is stored with the TV broadcast signal on the record medium in the main area data packs. This detection result is later retrieved from the main area packs upon reproduction by a reproducing circuit. The retrieved detection result is used to prevent copying of the TV broadcast signal when it is reproduced by the reproducing circuit of the VTR.

Reproducing Circuit

Figure 29:
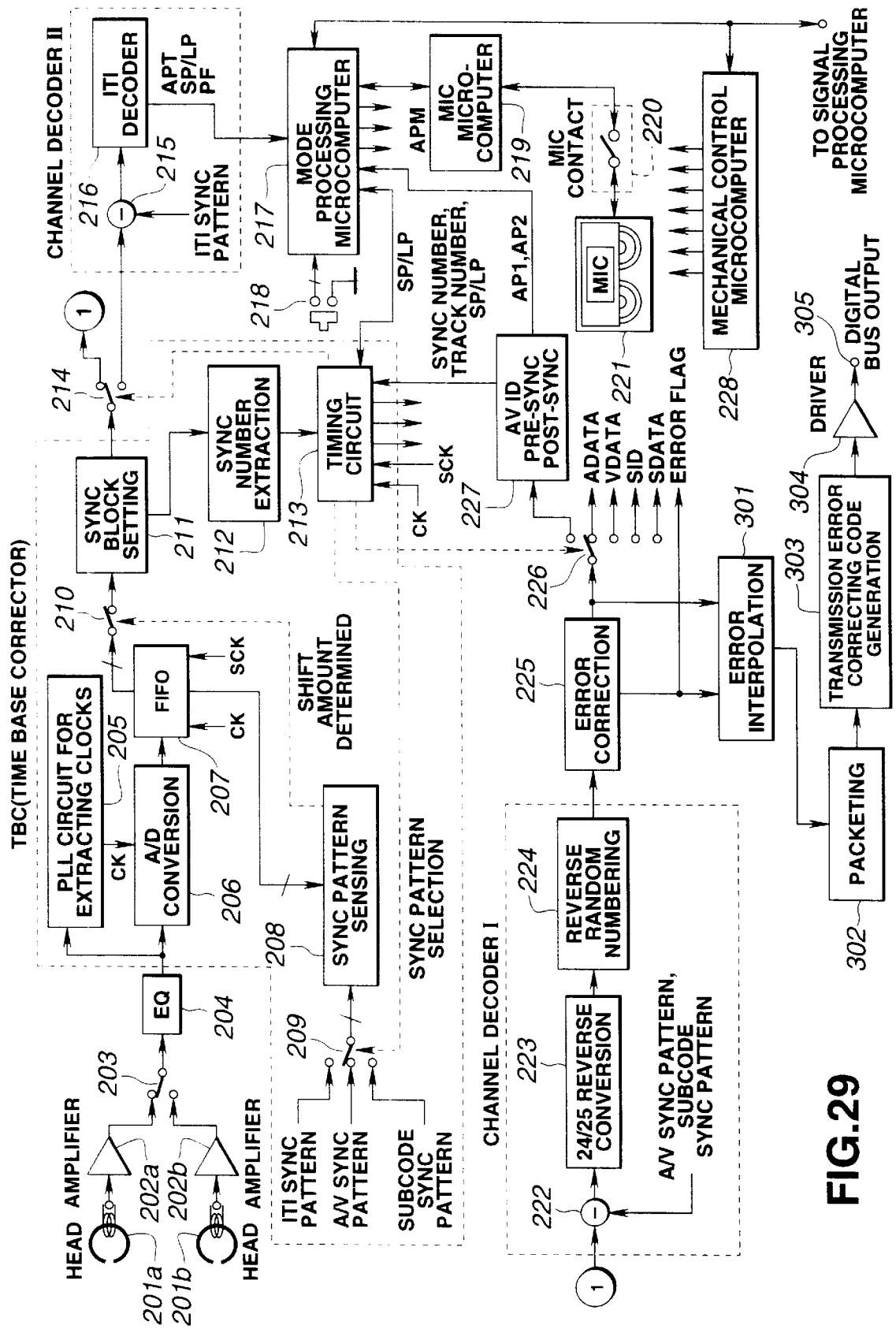
FIG. 29 is a block diagram of a portion of a reproducing circuit which incorporates the present invention.
Figure 30:
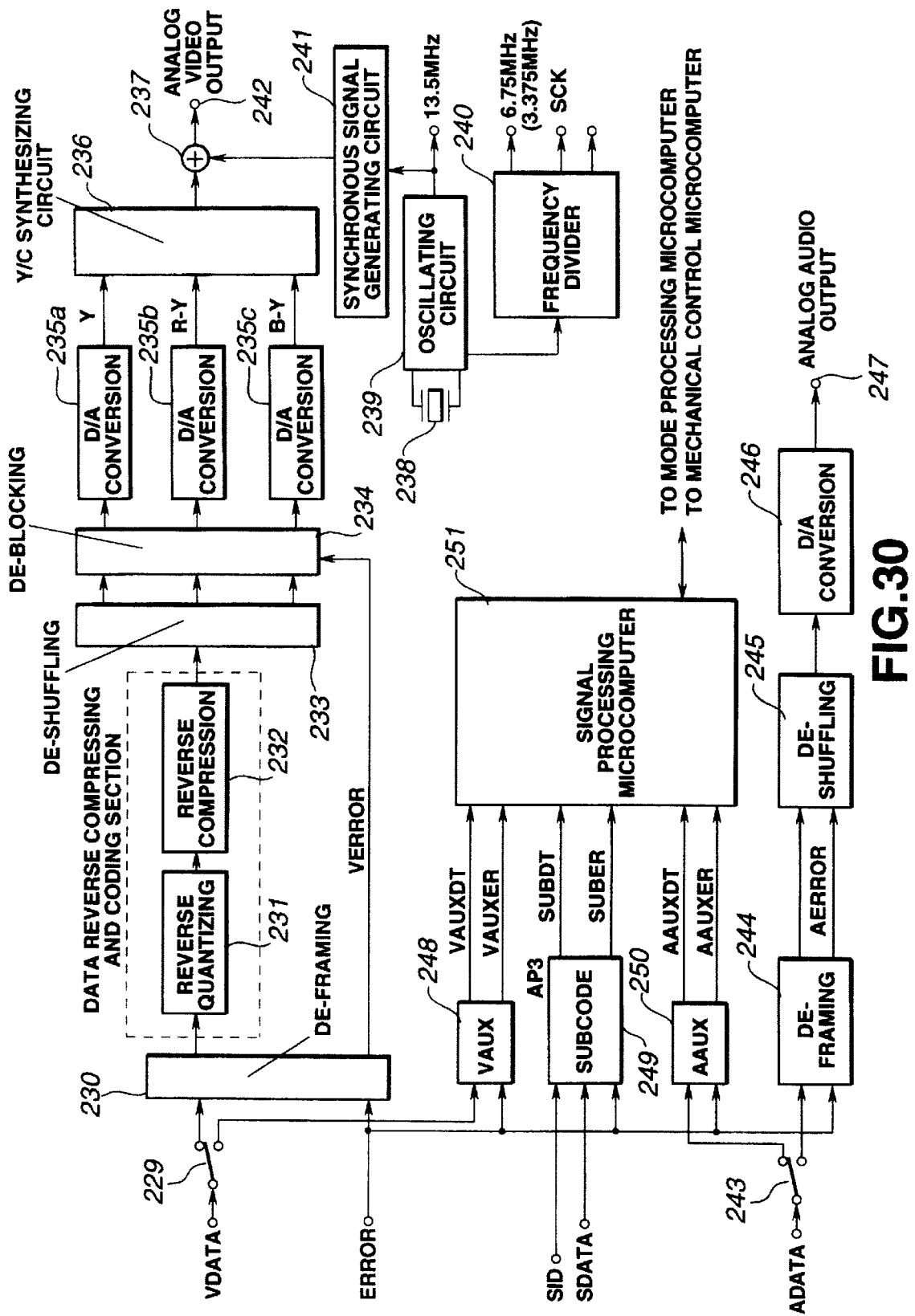
FIG. 30 is a block diagram of another portion of the reproducing circuit intended to be coupled to FIG. 29.

The reproducing circuit for reproducing video signals recorded in the tape format of FIG. 1 is shown in FIGS. 29 and 30. Dual reproducing heads 201*a* and 201*b* reproduce the video signals from alternating tracks on the record medium as shown in, for example, FIG. 22A. The video signals reproduced from the record medium by the reproducing heads are amplified by amplifiers 202*a* and 202*b*, respectively. The reproduced and amplified video signals are selected alternatively by a switch 203 to form a serial video signal and sent to equalizer circuit 204 which performs a reverse partial response class 4 emphasis to improve the electromagnetic converting characteristic of the reproduced signals.

A clock extracting circuit 205 extracts a clock component from the signal output of equalizer circuit 204 and generates therefrom a clock signal (CK). An analog-to-digital conversion circuit 206 converts the signal output from the equalizer circuit at a timing provided by the clock signal (CK) into digital data which is written into a FIFO buffer 207 at timing provided by the clock signal (CK).

Although the clock signal (CK) may be tainted by a jitter component due to mechanical vibrations in the rotation of the heads, this is not a problem when the video signals are sampled by this clock signal because the video signals also contain the jitter component. Analog-to-digital conversion circuit 206 converts the video signals into digital data and the jitter component is effectively filtered out of the digital video signal. Thus, when FIFO buffer 207 stores the digital video signal at a timing provided by the clock signal (CK) which has the jitter component, the clock signal (CK) is considered unstable and the digital video signal stored in the FIFO 207 may be sampled incorrectly.

Time base correction is provided by using a stabilized clock signal (SCK) to read the digital video signal from the FIFO 207. The stabilized clock signal (SCK) may be provided by an oscillating circuit 239 having a crystal oscillator 238 and a frequency divider 240 as shown in FIG. 30.

Preferably, the FIFO 207 stores the digital video signal at a faster write rate than the read speed at which the stored data is read from the FIFO 207. This ensures that data is always present in the FIFO 207 such that an underflow condition does not occur.

A sync pattern sensing circuit 208 senses sync patterns in the digital video signal recalled from the FIFO 207 and operates a switch 210 on the basis of the sensed sync pattern in order to segregate the sync blocks of data read from the FIFO. Different types of sync pattern references are provided to the sync pattern sensing circuit from a switch 209 which switches between an ITI sync pattern, an A/V sync pattern and a subcode sync pattern as these signals are played back from their respective areas on a track and read from FIFO 207. Switch 209 is switched according to the timing provided by a timing circuit 213 which generates a SYNC PATTERN SELECTION command to actuate switch 209 on the basis of a predetermined order of sync patterns.

The sync pattern sensing circuit 208 preferably has a fly-wheel structure that detects a particular type of sync pattern after a particular sync block length is read. If the proper sync pattern is sensed correctly, for example, three times or more, the sync pattern sensing circuit determines the sync pattern to be true; and this prevents erroneous detection of the particular type of sync pattern. The fly-wheel structure for detecting the particular sync pattern is best implemented if the FIFO 207 has, for example, three stages when sensing the particular sync pattern three times.

Sync blocks are shifted along the stages of the FIFO 207 by a predetermined amount following the sensing of the shift pattern; and this predetermined amount is produced by sync pattern sensing circuit 208 to close switch 210 on a track and read from FIFO 207, whereupon the FIFO 207 is connected to a sync block setting circuit 211. The sync block setting circuit latches the information bit read from the FIFO, including the sync number of the sync block being read out. The sync number is extracted by extracting circuit 212 and sent to timing circuit 213 which determines the location of the corresponding sync block on the track currently scanned by the reproducing heads. From the determined location, timing circuit 213 controls switch 209 to switch among the types of sync patterns; and controls switch 214 to couple the data sync blocks to a channel decoder I and the ITI sync blocks to channel decoder II. That is, when the reproducing heads are scanning the ITI sector, switch 214 is switched to the channel decoder II and, when the reproducing heads are scanning the audio, video or subcode sectors, switch 214 is switched to channel decoder I.

When switch 214 is switched to channel decoder II, the ITI sync blocks are sent to a subtracter 215 to remove the ITI sync pattern from the ITI sync blocks; and the remaining ITI data is decoded by an ITI decoder 216 to recover the application ID (APT), the SP/LP data and the pilot frame (PF), for example. The decoded ITI data is coupled to mode processing microcomputer 217 for determining the modes of the VTR. For example, a long-play mode indicated by the SP/LP data causes the mode processing microcomputer to, in turn, cause mechanical control microcomputer 228 to mechanically control the speed of the tape to effect long play reproduction.

The SP/LP data is also sent to timing circuit 213 for controlling the timing of the VTR operations in accordance with the standard or long play. The application ID (APT) is sent from mode processing microcomputer 217 to a signal processing microcomputer 251 to link related audio, video and subcode data. In addition, the application ID (APT) is sent by the mode processing microcomputer to a MIC microcomputer 219 for use in managing the MIC application ID (APM). Information from the MIC in cassette 221 is supplied to MCI microcomputer 219 via contact 220; and microcomputers 219 and 217 process this MIC data. MIC microcomputer 219 may, as an alternative, be omitted, leaving mode processing microcomputer 217 to control the overall system operation in association with mechanical control microcomputer 228 and signed processing microcomputer 251.

Similar to the recording circuit of FIG. 20, mode processing microcomputer 217 of the reproducing circuit of FIG. 29 includes a user-selectable switch array 218 to switch between different modes of the VTR. For example, the user may select a special playback mode, such as a fast/forward or fast/reverse playback mode. As in the recording circuit, the mode processing microcomputer here is generally responsible for controlling the overall VTR operations in association with mechanical control microcomputer 228 and signal processing microcomputer 251.

When switch 214 is switched by timing circuit 213 to channel decoder I, the audio, video and subcode sync blocks are sent to the channel decoder I and the sync patterns therein are subtracted from the corresponding sync blocks by subtractor 222. The remaining audio, video and subcode data after subtractor 222, then, undergoes a reverse 24/25 conversion in the reverse 24/25 conversion circuit 223. Next, a reverse random numbering circuit; 224 reverses the random numbering of the audio, video and subcode samples, returning these samples to their original data sequence.

The re-formed data sequence is error corrected by error correction circuit 225 using the parity codes (C1, C2) shown in FIG. 12A. If the error correction circuit is not able to completely correct the audio, video and subcode data, the error correction circuit produces an ERROR flag that is output with the audio, video and subcode data (ADATA, VDATA, SID, SDATA). An error interpolation circuit 301 also receives the ERROR flag and performs error interpolation on the audio, video and subcode data when this ERROR flag indicates that the error correction circuit did not completely error correct the data. The error interpolated data is packeted by a packeting circuit 302 and transmitted thereafter to a digital bus input 305 by a transmission error correcting code generation circuit 303 for adding a parity code to the packeted data and a driver 304 for buffering the packeted data.

Switch 226 is switched by timing circuit 213 to an AV ID pre-sync/post-sync circuit 227 which extracts the ID data and the pre-sync and post-sync blocks from the audio and video areas The data in the pre-sync and post-sync blocks include the sync number, the track number of the corresponding track read from the record medium and the SP/LP data. The timing circuit controls switch 226 based on this information to locate the audio, video and subcode data and to switch this data to the appropriate outputs (ADATA, VDATA, SID, SDATA).

The AV ID pre-sync/post-sync circuit 227 also extracts the application ID's (AP1, AP2) which determine the arrangement of the areas in each track. For example, as shown in FIGS. 5A and 5B the areas (AREA1, AREA2, AREA3 ) are reserved for an audio area, a video area and a subcode area when the application IDs (AP1, AP2, AP3=000). Preferably, this arrangement is the default condition and mode processing microcomputer 217 operates normally when these application IDs are set="000". When these application ID's are set to another value, the mode processing microcomputer performs a warning operation such as an alarm.

It will be recalled that the SP/LP data is stored in both the ITI data and the pre-sync block of each area. Both versions of the SP/LP data are retrieved from the ITI generated by the channel decoder II and from the pre-sync SP/LP data by the AV ID pre-sync/post-sync circuit 227, respectively. The SP/LP data is written three times in the TIA area of the ITI data and once in each of the two pre-sync blocks for both the audio and video areas (4 times). The correct SP/LP data for the TIA area in the ITT is determined by majority decision of the values of the thrice written SP/LP data. The SP/LP data for the pre-sync blocks is also determined by majority decision. If these two majority decisions do not agree, priority is placed on the SP/LP data in the ITI area.

The audio data (ADATA), the video data (VDATA), the subcode data (SID, SDATA) and the error flag (ERROR) provided by switch 226 in FIG. 29 are sent to the next stage of the reproducing circuit shown in FIG. 30. Switch 229 separates VDATA into video data and VAUX data. The video data is sent to a deframing circuit 230 to deframe the video data framed by framing circuit 15 (FIG. 20) in the recording circuit. The deframing circuit also receives the ERROR flag indicating that the error correction circuit 225 (FIG. 29) did not completely correct the errors in the video data and, in response thereto, executes propagating error processing. The propagating error processing corrects the affect of the error on other picture data. When the error is not significant, it is preferred that the deframing circuit does not perform error correction; instead, the video data is processed in an effort to clear the ERROR flag.

A data reverse compressing and coding section, then, decompresses and decodes the deframed video data. It will be recalled that the data compressing and coding section 14 of the recording circuit (FIG. 20) compressed the video data using a discrete cosine transform (DCT) or a variable length code (VLC) and quantized this coded video data. Accordingly, reverse quantizing circuit 231 de-quantizes the received de-framed data and reverse compression circuit 232 decompresses the de-quantized data using an inverse discrete cosine transform (IDCT) or an inverse variable length code (IVLC).

The resulting video data is arranged in, for example, 8×8 DCT blocks which were shuffled in the recording circuit to ensure that the video data was not lost due to head clogging or horizontal alignment error during recording. A deshuffling circuit 233 deshuffles the shuffled DCT blocks and a deblocking circuit 234 deblocks the DCT blocks.

The deshuffled and deblocked video data, which now are present as luminance (Y) and chrominance (R-Y, B-Y) components, are sent to digital-to-analog converters 235a, 235b and 235c, respectively, to convert the digital color components into corresponding analog color components of the video signal. These analog color components are synthesized by a Y/C synthesizing circuit 236 into an analog composite video signal to which is added vertical and horizontal synchronizing signals by an adder 237. The synchronizing signals are generated by a sync signal generating circuit 241 on the basis of an oscillation clock generated by an oscillating circuit 239 with the use of, for example, a crystal oscillator 238. The resultant video signal is sent to the output terminal 242 as a composite video signal.

The oscillating clock provides the sampling frequencies for the digital-to-analog converters 235a, 235b and 235c which are the same as the sampling frequencies used for A/D conversion. The frequency of the oscillation clock is 13.5 Mhz and is used by the digital-to-analog conversion circuit 235a for the luminance (Y) component. The digital-to-analog converters 235b and 235c for the color difference signals (R-Y, B-Y) employ a 6.75 Mhz or a 3.375 Mhz clock by dividing the 13.5 Mhz oscillating clock by a frequency divider 240.

The recovered picture may be modified on the basis of the VERROR flag derived from the ERROR flag. Then, for example, the picture data of a previous frame is stored in memory. The previous frame is used to replace the present erroneous picture block.

The audio data (ADATA), similarly, is switched between an AAUX circuit 250 and a deframing circuit 244 by a switch 243. The deframing circuit 244 deframes the audio data framed in the recording circuit by framing circuit 23. The deframing circuit 244 also performs the propagating error process if it determines from the ERROR flag that error correction circuit 225 (FIG. 29) did not completely error correct the audio data. At this time, the audio ERROR flag is represented by an AERROR flag indicating error propagating correction data to correct the effect of the error on other audio data. For example, in 16-bit audio sampling, with each audio data section consisting of eight bits, one ERROR flag overlaps two audio data sections.

A deshuffling circuit 245 deshuffles the deframed audio data deframed by deframing circuit 244, thereby returning the audio data from its shuffled arrangement to the original sequence. The deshuffling circuit 245 also provides error correction in response to the AERROR flag. For example, the deshuffling circuit 245 performs a pre-hold operation by replacing the immediately previous audio data with the erroneous audio data. In the situation where the period of the erroneous audio data is so long that replacing the erroneous audio data with the previous audio data is ineffective, the deshuffling circuit 245 mutes the erroneous audio data, thereby interrupting the sound itself.

A digital-to-analog conversion circuit 246 converts the audio data deshuffled by deshuffling circuit 245 from digital audio data to an analog audio output signal to be output from the analog audio output 247. The digital-to-analog conversion circuit is synchronized with the video data such that, for example, audio sounds are lip-synced to the persons in the corresponding video picture.

The VAUX, subcode and AAUX data is processed and sent to signal processing microcomputer 251. The VAUX data, for example, is separated from the VDATA by switch 229 and sent to VAUX circuit 248 along with the ERROR flag. The VAUX circuit pre-processes the VAUX data into VAUXDT data by, for example, selecting the VAUX data according to a majority decision of a plurality of duplicate sources of the VAUX data if the ERROR flag is present. Similarly, the subcode data (SID, SDATA) is pre-processed by a subcode circuit 249 by combining SID and SDATA into the SUBDT data and by relying on majority decision to correct the SUBDT data if the ERROR flag is set. An AAUX circuit 250 receives the AAUX data from the ADATA by operation of switch 243 and performs pre-processing similar to that performed by VAUX circuit 243. The pre-processed VAUXDT data, SUBDT data and AAUXDT data is, then, sent to signal processing microcomputer 251. If errors are left after the pre-processing, the error signals VAUXER, SUBER and AAUXER are generated and sent to the signal processing microcomputer 251 where they are employed therein to correct the uncorrected error in the VAUXDT, SUBDT, and AAUXDT data.

The subcode circuit 249 further extracts the application ID for the subcode data (AP3) and supplies this application ID to mode processing microcomputer 217 via signal processing microcomputer 251 to check the format of the application ID (AP3). When AP3="000", AREA3 is defined as the subcode area as shown in FIG. 5B. When the mode processing microcomputer detects that AP3 has some other value, a warning operation is performed by the mode processing microcomputer, such as an alarm.

It will be recalled that the same pack data is written in the main area (FIG. 13) ten times in a 525 lines/60 Hz system. Hence, if some of the written data packs are corrupted, the other data packs may be used to supplement the corrupted data. In this, case, the ERROR flag is not employed to correct the error. The optional area data packs, on the other hand, are written only once and, error correction cannot be performed by using error-free data packs. Instead, error correction is performed in this case using the ERROR data (VAUXER, AAUXER).

The error correction of the audio, video and subcode data is performed by signal processing microcomputer 251 using a propagation error process and a data modifying process based on an error correction result inferred from the context of each data pack. The success of the error correction is, then, supplied to mode processing microcomputer 217, which determines the next course of action for the VTR. For example, when the error correction process is successful, the mode processing microcomputer determines that the VTR operation may proceed.

Error Correction Example

An example of the error correction process will be described with reference to FIGS. 31 and 32. This example specifically describes error correction of the video accessory data (VAUX). Error correction of the audio accessory data (AAUX) is performed using equivalent processes and circuit structures; and in the interest of brevity, is not described herein. In the following example, VAUX data is not written in memory if an error takes place; and error correction on the basis of a majority decision is not discussed.

Figure 31:
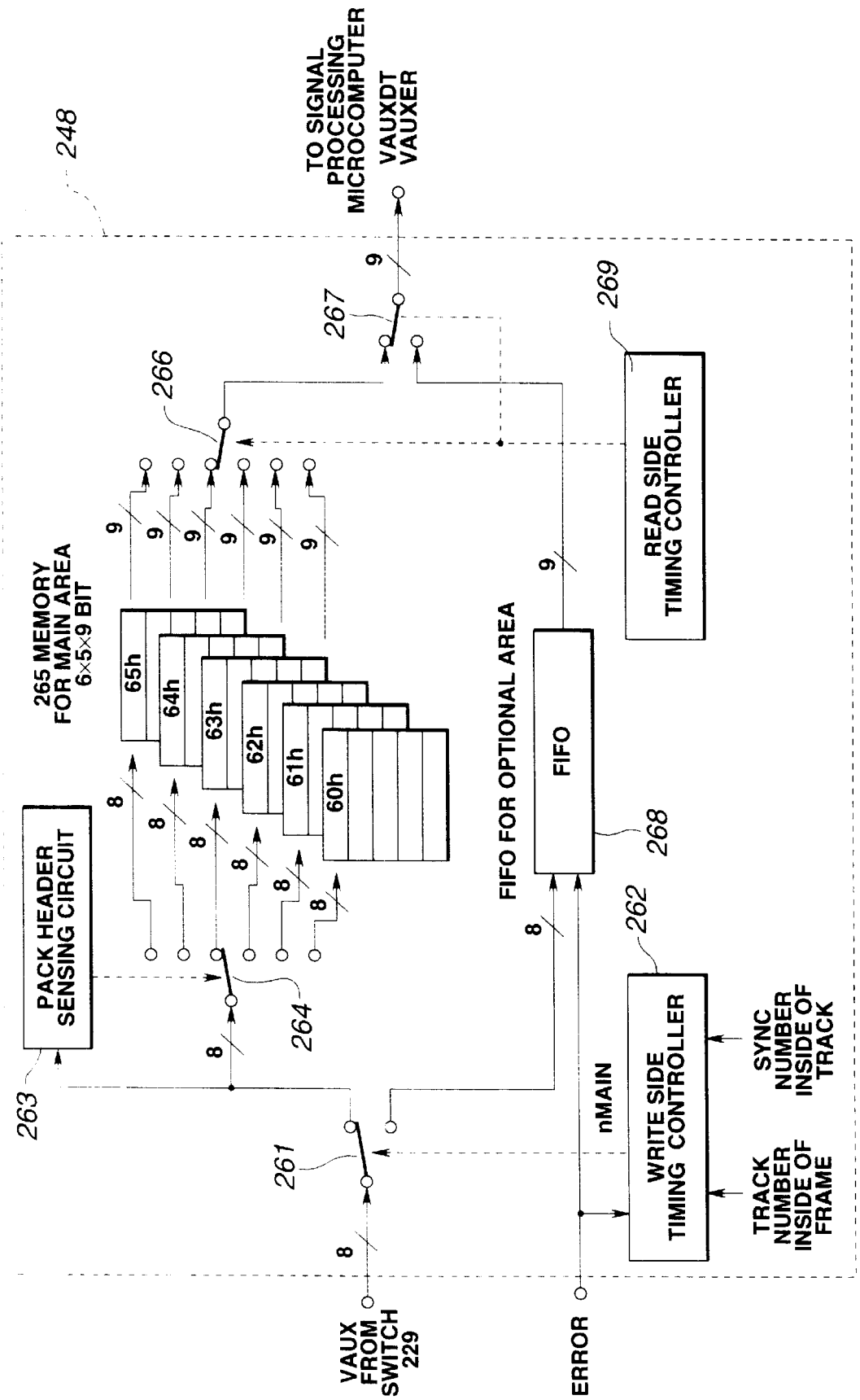
FIG. 31 is a block diagram of a VAUX detector provided in the reproducing circuit.

The VAUX circuit 248 shown in de:ail in FIG. 31 receives the VAUX data and the ERROR data. The VAUX data is switched by switch 261 between a memory 265 for the main area data packs and a FIFO buffer 268 for the optional area data packs. A write timing controller 262 operates switch 261 on the basis of a track number of the current frame and a sync number of the current track. For example, when the VAUX data on the+azimuth track (FIG. 22A) at sync number 156 is detected, the write timing controller switches switch 261 to couple the main area data packs of the VAUX data of sync block 156 to memory 265. FIG. 22B shows the nMAIN timing signal generated by write side timing controller 262 to change switch 261 between memory 265 for the main area data packs and FIFO 268 for the optional area data packs. For example, when the timing signal nMAIN= "L", the VAUX data of the main area data packs is present and switch 261 is switched to couple this VAUX data to memory 265 for the main area. At other times, when the timing signal nMAIN="H", the VAUX data for the optional area data packs is present and switch 261 is switched to couple this VAUX data to FIFO 268 for the optional area.

A pack header sensing circuit 263 reads a header of the pack data from the main area data packs and switches switch 264 based on this pack header. Each of the data packs which store essential information in the main area of FIG. 13 (50h . . . 55h) is stored in corresponding 6×5×9 memory blocks (60h . . . 65h) by operation of switch 264.

Preferably, memory 265 for the main area is pre-set to "1"s for each video frame, meaning that no data exists in this memory. If an error is detected, no action is taken. On the other hand, if no error is detected, the video accessory data (VAUX) is written to memory 265 for the main area and a value of "0" is written to the ERROR flag. It will be recalled that the same data pack is written ten times in the main area for a single video frame (12 times the PAL video system). Hence, all of the written data packs in the main area should be reproduced before determining that no error exists. Accordingly, the ERROR flag is finally determined at the end of all the data packs for the main area and stored thereafter, i.e., at the end of one video frame.

The optional area data packs are treated differently than the main area packs. Since the data packs for the optional area are written once, the ERROR flag can De accessed immediately; that is, without waiting for the end of the video frame and is written to the FIFO 268 for the optional area. A read timing controller 269 controls switches 266 and 267 to selectively switch, onto one signal line, the VAUX data in memory 265 for the main area and the VAUX data in FIFO 268 for the optional area, thereby synthesizing the VAUXDT and VAUXER data provided to signal processing microcomputer 251 (FIG. 30).

Signal Processing Microcomputer

The VAUXDT and VAUXER data generated by VAUX circuit 248, as described with reference to FIG. 31, are sent to the signal processing microcomputer 251 shown in more detail in FIG. 32. It will be recalled that the VAUXDT data is the VAUX data after pre-processing, such as the pre-hold processing which corrects an error by holding previously stored VAUX data, thereby replacing currently stored erroneous VAUX data. The VAUXER data represents an error correction value left-over after the pre-processing of the VAUX data.

The VAUXDT data is sent to a pack header identifying circuit 271 which controls switch 272 to selectively couple the VAUXDT data to the memory blocks (60h . . . 65h) of memory 272 according to the pack header identified by the pack header identifying circuit. When the VAUXER data indicates that the VAUXDT data is left uncorrected by the pre-processing of the VAUX circuit 248, a read/write circuit 273 prevents switch 272 from coupling the VAUXDT data to any of the memory blocks in memory 272.

It will be appreciated that the VAUX circuit 248 (FIG. 31) has already recombined the pack data from the main area and optional area packs. Therefore, it is not necessary for the signal processing microcomputer of FIG. 32 to distinguish between main area and optional area data packs. Accordingly, data packs for both the main area and optional area are stored in the same memory blocks of memory 272.

When the ERROR flag="1", for example, meaning that an error has been detected, read/write circuit 273 inhibits the writing of the VAUXDT data to memory blocks of memory 272. When the VAUXDT data corresponds to main area data packs, wherein the data packs are stored in the main area a multiple of times, an error in one of the data blocks is corrected by replacing the erroneous data block with another error-free data block. This can be done for the data blocks in the main area because these data blocks are considered correlated with the corresponding data blocks in the previous frame. On the other hand, the optional area data blocks are not considered correlated with the corresponding optional area data blocks in the previous frame. Accordingly, the error propagating process must be relied upon to error correct each optional area data pack individually.

The error correction method for the main area data packs is initiated by changing all of the erroneous data packs into "Ffh", meaning a pack with "no information" for data packs having a 5-byte fixed length Main area data packs generally correspond to each other and an error-free data pack in the main area can replace an erroneous main area data pack. For example, TELTEXT data representing textual data includes many data packs of the textual data chained together. Since the pack headers in each of the packs for the TELTEXT data are the same, an erroneous pack header for this data may be easily replaced with another pack header. On the other hand, if the error takes place in the data section, thereby corrupting the textual data itself, there are generally no other data packs that correlate to the corrupted data pack and the error cannot be corrected by changing the erroneous data pack to a pack with "no information". In this latter situation, the erroneous data block is left intact and sent to a TELTEXT decoder which error corrects the erroneous textual data block.

Figure 32:
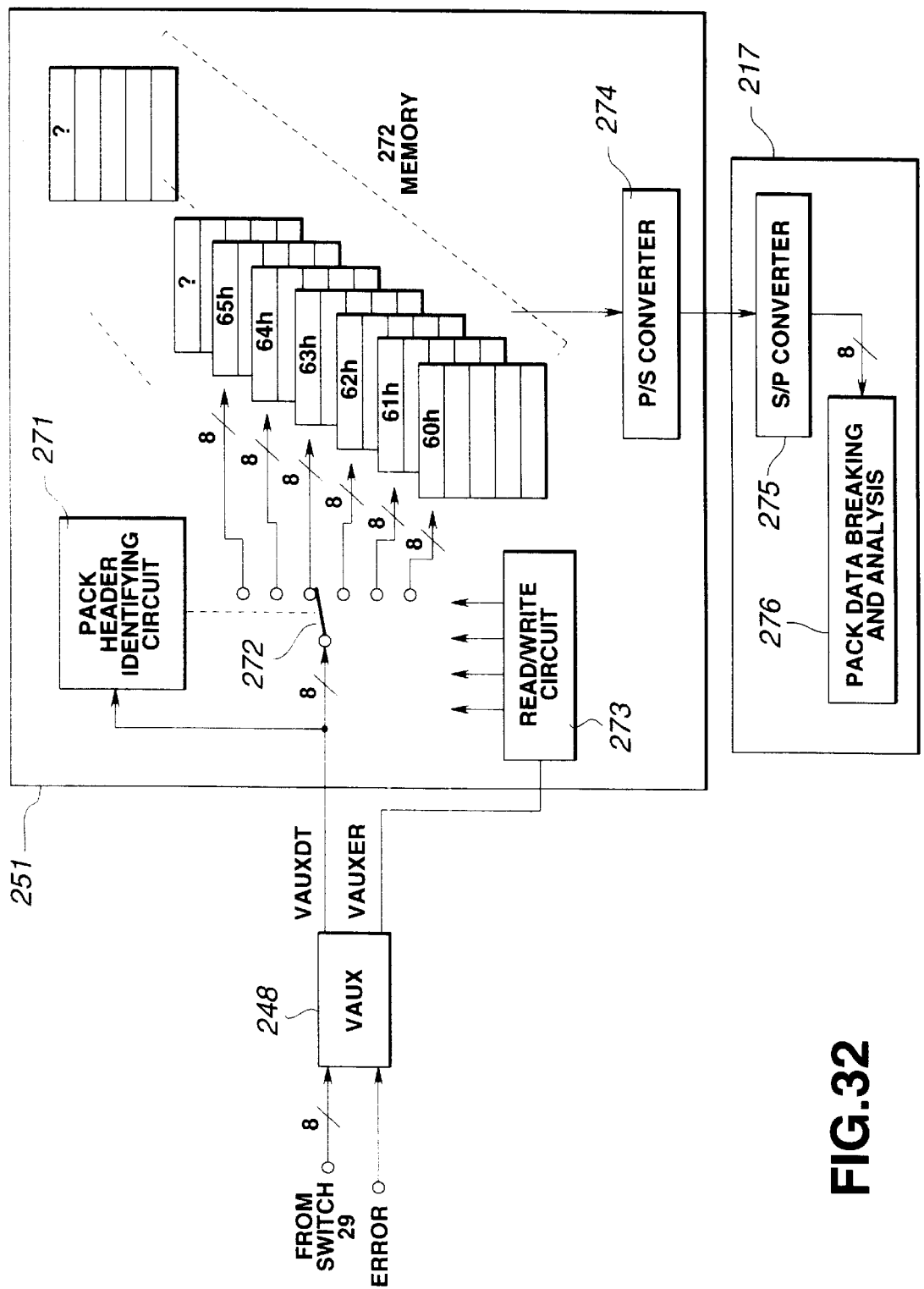
FIG. 32 is a block diagram of a VAUX reproducing circuit intended to be coupled to FIG. 31.

Assuming that the foregoing error correction process has not set the ERROR flag to indicate an error, the VAUXDT data is converted by parallel/serial converting circuit 274 (FIG. 32) into serial data and transmitted along an intra-microcomputer communication protocol line to mode processing microcomputer 217 as shown in FIG. 32. The mode processing microcomputer receives the transmitted serial data from the signal processing microcomputer and converts this serial data back into parallel form by use of a serial/parallel converting circuit 275. The pack data so converted into parallel bits is decomposed and analyzed by an analyzing section 276. The analyzing process is the reverse of the process of generating the pack data in mode processing microcomputer 34 provided in the foregoing recording circuit (FIG. 20).

It will be appreciated that the MIC microcomputer 219 of the reproducing circuit performs the reverse functions of the MIC microcomputer 38 of the recording circuit in FIG. 20. Accordingly, a duplicate description of MIC microcomputer 219 for the reproducing circuit is not provided.

Digital Bus Application for Dubbing

Figure 33:
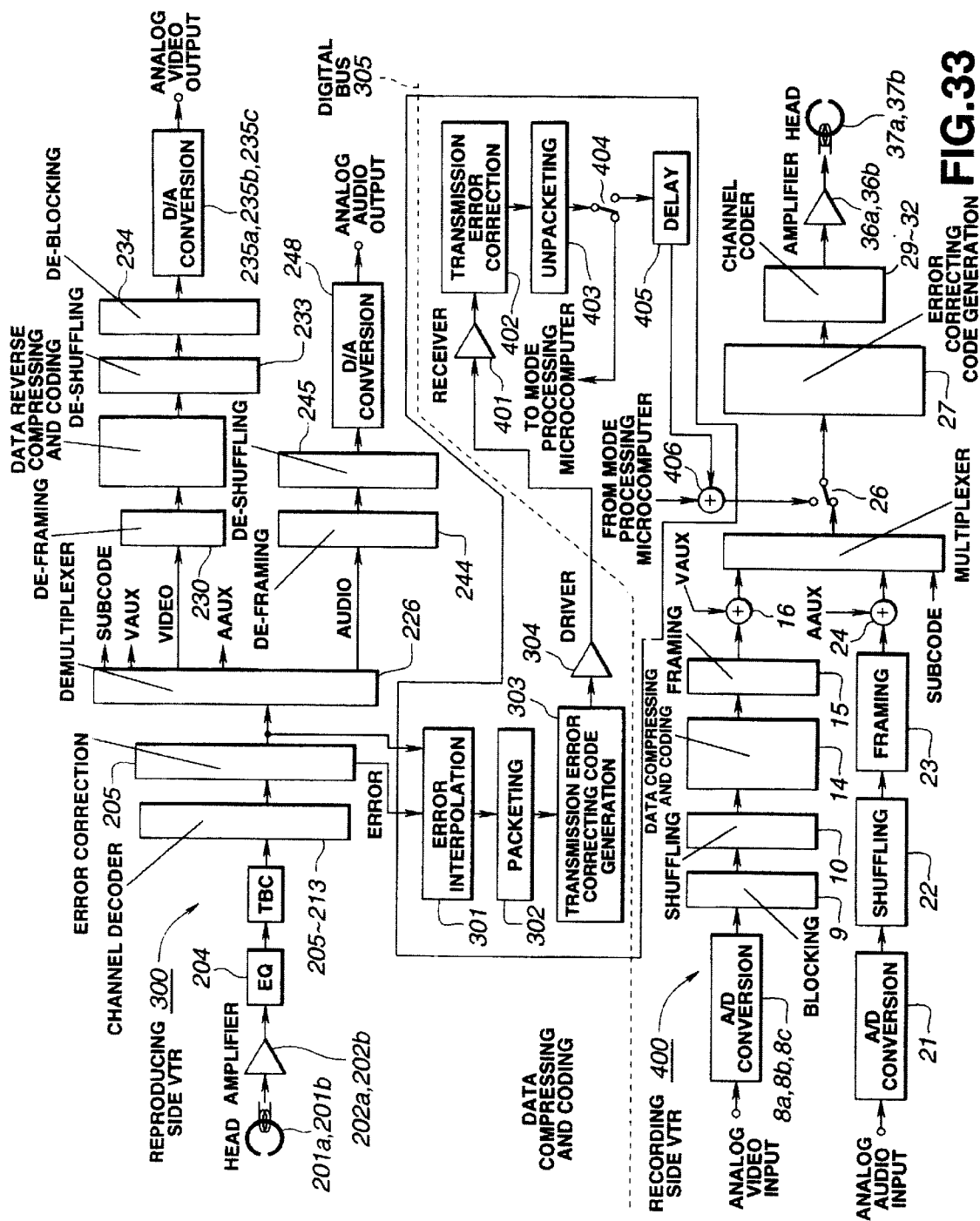
FIG. 33 is a block diagram of a digital copying circuit.

The present invention is particularly applicable to a digital VTR that uses a digital bus scheme. As shown in FIG. 33, the digital VTR includes a reproducing circuit 300 and a recording VTR circuit 400 which have been simplified in the figure for purposes of this description. The reproducing and the recording circuit communicate over a digital bus represented by the dashed-line therebetween.

The reproducing VTR 300 includes an error interpolation circuit 301 and a packeting circuit 302 to produce transmission packets for transmission over the digital bus. It will be appreciated that the reproduced data from the record medium may include errors that even the foregoing error correction process may not be able to correct. Accordingly, the error interpolation circuit is provided to interpolate otherwise uncorrectable data.

The error interpolating circuit 301, upon detecting the ERROR flag, thus determining that an error in the data packs exists, awaits an error-free data pack. In the case of the main area data packs, the error interpolation circuit may await several main area data packs before encountering the error-free data pack. When the error-free data pack is received by the error interpolation circuit, this circuit interpolates data from this error-free data pack and inserts this interpolated data into the erroneous data packs.

In the situation where the data pack is not written many times, such as the optional area data packs, it is fruitless for the error interpolation circuit 301 to await an error-free data pack because the data packs do not correlate and an interpolation from these non-correlative data packs would be inaccurate. In this latter situation, the erroneous data is replaced with the data set forth below to report that an error has taken place and is uncorrected. This replacement data is inserted as many times as there are erroneous data packs so long as the data packs do not correlate.

---
Audio Data (for 16 bits)
1000 0000 0000 0000
Audio Data (for 8 Bits)
1000 0000 0000 0000
Video Data (DC Component of DCT)
1000 0000 0000 0110
Pack Structure
No Info pack

---

The pack data thus error-interpolated by error interpolation circuit 301 is packed into packets by packeting circuit 302 for transmission. Then, the packets are supplied to a transmission error correcting code generating circuit 303 which adds parity data to the packeted data for correcting an error in transmission over the digital bus. The packets and parity data are, then sent to a driver circuit 304 to buffer the error protected data to the digital bus.

The data transmitted over the digital bus 305 is received by receiver 401 in the recording VTR 400 and supplied to a transmission error correction circuit 402 which error corrects the received digital bus data according to the parity inserted therein. The error corrected digital bus data is, then, sent to an unpacketing circuit 403 to unpack the digital bus data from the packets formed by packeting circuit 302. If an error still exists after error correction by transmission error correction circuit 402, the corresponding digital bus packets are considered as error data and the error correction process described above is performed.

A switch 404 receives the unpacketed data from unpacketing circuit 403 and separates therefrom the audio, video and system data. The position of the system data within the digital bus data is predetermined and switch 404 selects the system data by switching the unpacketed digital bus data from unpacketing circuit 403 to mode processing microcomputer 217 of the recording VTR. The mode processing microcomputer employs the system data to carry out operations of the VTR. The audio and video data, on the other hand, are selected by switch 404 and sent thereby to a delay circuit 405. The delay circuit delays a selected audio or video data by a delay amount corresponding to the processing time of the signal processing microcomputer 20.

The delayed video/audio data delayed by delay circuit 405 is combined with data from the mode processing microcomputer by adder 406. The combined data is sent from switch 26 to the recording circuit of the recording VTR through error correcting code generating circuit 27. If a signal such as CGMS, for example, is used for prohibiting copying of the reproduced program, the signal processing microcomputer 20 provides an indication thereof to the mode processing microcomputer 34. In response thereto, the mode processing microcomputer issues a command to the mechanical control microcomputer 28 to inhibit the operation of the recording mechanism, thereby disabling the recording of the TV broadcast program.

Although an illustrated embodiment of the invention has been described in detail herein with reference to the accompanying drawings, it is to be noted that the invention is not limited to that embodiment, and that various changes and modifications may be affected therein by one skilled in the art without departing from the scope and spirit of the invention which is intended to be defined by the appended claims.

What is claimed is:

1. A method for copy protecting television broadcast program signals transmitted by a broadcasting system and received by a video recorder, said video recorder recording said television broadcast program signals as digital signals in a format, reserving areas for accessory information relating to said format, and reserving other areas for digital image signals, said method comprising steps of:

receiving transmitted signals;

determining whether the received signals are the television broadcast program signals transmitted by said broadcasting system;

detecting a generation limiting signal and determining whether said generation limiting signal indicates a copy once state for allowing the television broadcast program signals to be copied once;

changing a record generation limiting signal to be recorded in said recording areas reserved for said accessory information from the copy once state represented by said generation limiting signal allowing the received signals, once recorded, to be copied, to a copy protect state which inhibits copying of said received signals when said received signals are determined to be said television broadcast program signals;

inserting said generation limiting signal in said areas reserved for said accessory information in those digital signals determined to be the television broadcast program signals; and recording to said video recorder said received television broadcast program signals including said generation limiting signal, wherein when said generation limiting signal is not detected at said detecting step, said inserting step inserts a record generation limiting signal indicating said copy once state in said areas reserved for said accessory information in those digital signals determined to be television broadcast program signals, and wherein said television broadcast program signals includes AAUX/VAUX source control packs for respective audio and video source control information; and further comprising the step of retrieving from an AAUX/VAUX source control pack copy generation limiting signals (CGMS) as said generation limiting signal.

2. A video recorder for copy protecting television broadcast program signals transmitted by a broadcasting system and received by said video recorder, said video recorder being operable to digitally record said television broadcast program signals in a format, reserving recording areas for accessory information relating to said formal, and reserving other recording areas for digital image signals, said video recorder comprising:

means for receiving transmitted signals as input signals;

means for coding said input signals for recording in accordance with said format and for recording the coded input signals in said reserved other recording areas;

means for recording, in said recording areas reserved for said accessory information, a record generation limiting signal for copy protecting said input signals to be recorded in said other recording areas;

means for determining whether said input signals are television broadcast program signals transmitted by said broadcasting system;

means for detecting a generation limiting signal and determining whether said generation limiting signal indicates a copy once state for allowing the television broadcast program signals to be copied once;

means for changing said record generation limiting signal to be recorded in said recording areas reserved for said accessory information from a copy allow state allowing the input signals, once recorded, to be copied, to a copy protect state for copy protecting said input signals to prevent said input signals, once recorded, to be copied, when said means for determining determines said input signals are television broadcast program signals; and means for setting said record generation limiting signal to a copy once state allowing the input signals, once recorded, to be copied once, in said recording areas reserved for said accessory information when said input signals are determined to be the television broadcast program signals and said generation limiting signal is not detected by said detecting means, wherein said television broadcast program signals includes AAUX/VAUX source control packs for respective audio and video source control information; and further comprising means for retrieving from an AAUX/VAUX source control pack copy generation limiting signals (CGMS) as said generation limiting signal.

3. A video recorder/reproducer for copy protecting television broadcast program signals transmitted by a broadcasting system and received by said video recorder/reproducer, said video recorder/reproducer being operable to digitally record said television broadcast program signals in a video recorder format reserving recording areas for accessory information relating to said format and reserving other recording areas for digital image signals, said video recorder/reproducer being further operable to reproduce those signals which have been recorded in said format, said video recorder/reproducer comprising:

means for receiving transmitted signals as input signals;

means for coding said input signals for recording in accordance with said format and for recording the coded input signals in said reserved other recording areas;

means for detecting a generation limiting signal and determining whether said generation limiting signal indicates a copy once state for allowing the television broadcast program signals to be copied once;

means for recording, in said recording areas reserved for said accessory information, said generation limiting signal for copy protecting said input signals to be recorded in said other recording areas;

means for determining whether said input signals are television broadcast program signals transmitted by said broadcast system;

means for changing said generation limiting signal to be recorded in said recording areas reserved for said accessory information from a copy allow state allowing the input signals, once recorded, to be copied, to a copy protect state for copy protecting said input signals to prevent said input signals, once recorded, to be copied, when said means for determining determines said input signals are television broadcast program signals;

means for inserting a record generation limiting signal indicating a copy once state allowing the input signals, once recorded, to be copied once, in said recording areas reserved for said accessory information when said input signals are determined to be the television broadcast program signals and said generation limiting signal is not detected by said detecting means;

means for reproducing the recorded input signals and the recorded accessory information, including said generation limiting signal; and means for inserting said generation limiting signal into television signals derived from the reproduced signals when said generation limiting signal reproduced from said recording areas reserved for said accessory information is set to the copy protect state, and for changing said reproduced generation limiting signal from the copy allow state allowing copying to the copy protect state for preventing copying and inserting the changed generation limiting signal into said derived television signals, when said reproduced generation limiting signal indicates copy protection of the reproduced input signals, wherein said television broadcast program signals includes AAUX/VAUX source control packs for respective audio and video source control information; and further comprising means for retrieving from an AAUX/VAUX source control pack copy generation limiting signals (CGMS) as said generation limiting signal.

4. A video reproducer for reproducing copy protected television broadcast program signals which include said television broadcast program signals having been digitally transmitted from a television broadcasting station, received and recorded as digital video signals in respective video areas of a record medium and related accessory information in other areas reserved therefore, with said accessory information including generation limiting data derived from a generation limiting signal included in said television broadcast program signals, comprising:

means for reproducing said digital video signals and said generation limiting data from said record medium;

means responsive to the reproduced generation limiting data for generating and inserting generation limiting signals into television signals derived from the reproduced digital video signals when said reproduced generation limiting data is set to a copy protecting state;

means for changing the reproduced generation limiting data from a copy allow state allowing copying to the copy protecting state that prevents copying; and means for generating and inserting a changed generation limiting signal into said derived television signals when said reproduced generation limiting data indicates copy protection of the reproduced digital video signals, wherein said generation limiting data indicating a copy once state allowing the input signals, once recorded, to be copied once, is recorded in said other reserved areas when said input signals are determined to be the television broadcast program signals and the generation limiting signal therefor is not detected, wherein said television broadcast program signals includes AAUX/VAUX source control packs for respective audio and video source control information and further comprising means for retrieving from an AAUX/VAUX source control pack copy generation limiting signals (CGMS) as said generation limiting data.

* * * * *